(12) United States Patent
Zhou et al.

(10) Patent No.: US 8,086,955 B2
(45) Date of Patent: Dec. 27, 2011

(54) METHODS AND APPARATUS FOR MODIFYING PROCESS CONTROL DATA

(75) Inventors: Ling Zhou, Cedar Park, TX (US);
Stephen G. Hammack, Austin, TX (US); Bruce Campney, Manor, TX (US); Larry O. Jundt, Round Rock, TX (US); Mark J. Nixon, Round Rock, TX (US); Stephen Gilbert, Austin, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 838 days.

(21) Appl. No.: 11/556,612

(22) Filed: Nov. 3, 2006

(65) Prior Publication Data

US 2007/0061786 A1 Mar. 15, 2007

Related U.S. Application Data

(63) Continuation of application No. PCT/US2005/015596, filed on May 4, 2005.

(60) Provisional application No. 60/567,980, filed on May 4, 2004.

(51) Int. Cl.
*G06F 17/00* (2006.01)
(52) U.S. Cl. ......... 715/234; 715/239; 715/273; 715/733
(58) Field of Classification Search .................. 715/234, 715/249
See application file for complete search history.

(56) References Cited

U.S. PATENT DOCUMENTS

| 5,168,441 | A | 12/1992 | Onarheim et al. |
|---|---|---|---|
| 5,611,059 | A | 3/1997 | Benton et al. |
| 5,631,825 | A | 5/1997 | Van Weele et al. |
| 5,680,409 | A | 10/1997 | Qin et al. |
| 5,706,455 | A | 1/1998 | Benton et al. |
| 5,838,563 | A * | 11/1998 | Dove et al. ..................... 700/83 |
| 5,841,654 | A | 11/1998 | Verissimo et al. |
| 5,926,177 | A | 7/1999 | Hatanaka et al. |
| 6,173,208 | B1 | 1/2001 | Park et al. |
| 6,362,839 | B1 | 3/2002 | Hamilton et al. |
| 6,385,496 | B1 | 5/2002 | Irwin et al. |

(Continued)

FOREIGN PATENT DOCUMENTS

AU 2003204824 1/2004

(Continued)

OTHER PUBLICATIONS

Yang, S.H. "Design Issues and Implementation of Internet-based process control systems", Oct. 18, 2001, pp. 709-720.*

(Continued)

*Primary Examiner* — Quoc A Tran
(74) *Attorney, Agent, or Firm* — Hanley, Flight & Zimmerman, LLC.

(57) ABSTRACT

Methods, apparatus, and articles of manufacture for modifying process control data involve obtaining the process control data in an extensible markup language format, converting the process control data in the extensible markup language format to a second data format, and storing the process control data in a database. The process control data is subsequently edited by retrieving the process control data from the database, modifying the process control data, storing the modified process control data in the second data format in the database, converting the modified process control data from the second data format to the extensible markup language format, and storing the modified process control data in the extensible markup language format.

19 Claims, 30 Drawing Sheets

U.S. PATENT DOCUMENTS

| | | | |
|---|---|---|---|
| 6,396,516 | B1 | 5/2002 | Beatty |
| 6,445,963 | B1 | 9/2002 | Blevins et al. |
| 6,571,133 | B1 | 5/2003 | Mandl et al. |
| 6,587,108 | B1 | 7/2003 | Guerlain et al. |
| 6,618,630 | B1 | 9/2003 | Jundt et al. |
| 6,633,782 | B1 | 10/2003 | Schleiss et al. |
| 6,691,280 | B1 | 2/2004 | Dove et al. |
| 6,957,110 | B2 | 10/2005 | Wewalaarachchi et al. |
| 6,973,508 | B2 | 12/2005 | Shepard et al. |
| 7,043,311 | B2 | 5/2006 | Nixon et al. |
| 7,110,835 | B2 | 9/2006 | Blevins et al. |
| 7,234,138 | B2* | 6/2007 | Crevatin ............... 717/168 |
| 7,320,005 | B2* | 1/2008 | Li et al. ............... 707/102 |
| 7,376,661 | B2* | 5/2008 | Larson ............... 707/101 |
| 7,467,018 | B1* | 12/2008 | Callaghan ............... 700/1 |
| 2001/0034733 | A1 | 10/2001 | Prompt et al. |
| 2002/0019672 | A1 | 2/2002 | Paunonen |
| 2002/0022894 | A1 | 2/2002 | Eryurek et al. |
| 2002/0022895 | A1 | 2/2002 | Genise et al. |
| 2002/0055790 | A1 | 5/2002 | Havekost |
| 2002/0077711 | A1 | 6/2002 | Nixon et al. |
| 2002/0156872 | A1 | 10/2002 | Brown |
| 2003/0014500 | A1* | 1/2003 | Schleiss et al. ............... 709/218 |
| 2003/0028268 | A1* | 2/2003 | Eryurek et al. ............... 700/73 |
| 2003/0028269 | A1 | 2/2003 | Spriggs et al. |
| 2003/0191803 | A1 | 10/2003 | Chinnici et al. |
| 2003/0236576 | A1 | 12/2003 | Resnick et al. |
| 2004/0030739 | A1* | 2/2004 | Yousefi'zadeh ............... 709/201 |
| 2004/0075689 | A1 | 4/2004 | Schleiss et al. |
| 2004/0177321 | A1* | 9/2004 | Brown et al. ............... 715/513 |
| 2004/0181746 | A1* | 9/2004 | McLure et al. ............... 715/500 |
| 2004/0205656 | A1* | 10/2004 | Reulein et al. ............... 715/530 |
| 2005/0015439 | A1* | 1/2005 | Balaji et al. ............... 709/203 |
| 2005/0165731 | A1* | 7/2005 | Funk ............... 707/1 |
| 2005/0197803 | A1 | 9/2005 | Eryurek et al. |
| 2005/0197805 | A1 | 9/2005 | Eryurek et al. |
| 2005/0197806 | A1 | 9/2005 | Eryurek et al. |
| 2006/0259524 | A1* | 11/2006 | Horton ............... 707/201 |

FOREIGN PATENT DOCUMENTS

| | | |
|---|---|---|
| EP | 0 813 129 A2 | 12/1997 |
| EP | 1 122 652 A | 8/2001 |
| EP | 1122652 | 8/2001 |
| GB | 2 349 958 A | 11/2000 |
| GB | 2349958 | 11/2000 |
| GB | 2379749 | 3/2003 |
| WO | 95/04314 A1 | 2/1995 |
| WO | 9504314 | 2/1995 |
| WO | 02054184 | 7/2002 |
| WO | 02/071169 A | 9/2002 |
| WO | 02071169 | 9/2002 |
| WO | 03060751 | 7/2003 |
| WO | 03/075206 A | 9/2003 |
| WO | 03075206 | 9/2003 |
| WO | 2005/107409 A2 | 11/2005 |
| WO | 2005/107410 A1 | 11/2005 |
| WO | 2005/109122 A1 | 11/2005 |
| WO | 2005/109123 A1 | 11/2005 |
| WO | 2005/109124 A1 | 11/2005 |
| WO | 2005/109125 A1 | 11/2005 |
| WO | 2005/109126 A1 | 11/2005 |
| WO | 2005/109127 A1 | 11/2005 |
| WO | 2005/109128 A1 | 11/2005 |
| WO | 2005/109129 A1 | 11/2005 |
| WO | 2005/109130 A1 | 11/2005 |
| WO | 2005/109131 A1 | 11/2005 |
| WO | 2005/109250 A1 | 11/2005 |
| WO | 2005/109250 A2 | 11/2005 |

OTHER PUBLICATIONS

Camo Software, Inc, The Unscrambler 9.6 product datasheet, www.camo.com, 2 pages.

Statsoft, Statistica: Multivariate Statistical Process Control product datasheet, www.statsoft.com, 2 pages.

Umetrics Inc., Product Specification for SIMCA-P 11, www.umetrics.com, 2 pages.

Mehta, Ashish, Ganesamoorthi, Sai, and Wojsznis, Willy, Feedforward Neural Networks for Process Identification and Prediction, Neural Network and Expert Systems Presentation, 2001, 9 pages.

Tzovla, Vasiliki and Zhang, Yan, Abnormal Condition Management using Expert Systems, Neural Network and Expert Systems Presentation, 2001, 9 pages.

Official Action dated May 23, 2008, in Chinese Application No. 200580014498.6 (25 pages).

Sangyong Han and Kyoungie Oh, "Web Based rSPC (realtime Statistical Process Control) System Supporting XML," Computer Engineering Department Chung-Ang University, IEEE, 2001 (pp. 399-403).

International Preliminary Report on Patentability corresponding to International Application No. PCT/US2005/015596 mailed on Nov. 16, 2006.

Patent Cooperation Treaty, International Preliminary Report on Patentability for PCT/US2005/015585, Nov. 16, 2006, 10 pages.

UK Intellectual Property Office, Examination Report under Section 18(3) for Application No. GB0621082.7, May 4, 2007, 6 pages.

United Kingdom Intellectual Property Office, Examination Report under Section 18(3), issued on Jan. 17, 2008, in connection with corresponding United Kingdom Patent Application No. GB0621082.7 (4 pages).

The International Bureau, "International Preliminary Report on Patentability," issued by the International Bureau on Nov. 7, 2006, in connection with a counterpart international application No. PCT/US2005/015596 (7 pages).

State Intellectual Property Office of P.R. China, a first Office action issued on May 23, 2008, in connection with corresponding Chinese Patent Application No. 200580014498.6, with its English language translation (25 pages).

Fisher-Rosemount Systems, Inc., DeltaV Bulk Edit, pp. 1-12, Apr. 2002.

Kopp, John, About.com, C++ Tutorial—Lesson 29: Inheritance, Continued, http://www.cplus.about.com/od/beginnerctutorial/l/aa12050c.htm, downloaded Apr. 27, 2005.

Kopp, John, About.com, C++ Tutorial—Lesson 29: Inheritance, http://cplus.about.com/od/beginnerctutorial/l/aa120502b.htm, downloaded Apr. 27, 2005.

Kopp, John, About.com, C++ Tutorial—Lesson 29: Inheritance Introduction, http://cplus.about.com/od/beginnerctutorial/l/aa120502a.htm, downloaded Apr. 27, 2005.

Kopp, John, About.com, C++ Tutorial—Lesson 17: Classes, Members and Methods, Defining Methods, http://cplus.about.com/od/beginnerctutorial/l/aa070602c.htm, downloaded Apr. 27, 2005.

Kopp, John, About.com, C++ Tutorial—Lesson 17: Classes, Members and Methods, Defining Classes, http://cplus.about.com/od/beginnerctutorial/l/aa070602b.htm, downloaded Apr. 27, 2005.

Kopp, John, About.com, C++ Tutorial—Lesson 17: Classes, Members and Methods, http://cplus.about.com/od/beginnerctutorial/l/aa070602a.htm, downloaded Apr. 27, 2005.

Kopp, John, About.com, C++ Tutorial—Lesson 9: Introduction to Classes, Object Terminology, http://cplus.about.com/od/beginnerctutorial/l/aa041002e.htm, downloaded Apr. 27, 2005.

Kopp, John, About.com, C++ Tutorial—Lesson 9: Introduction to Classes, Using Objects, http://cplus.about.com/od/beginnerctutorial/l/aa041002d.htm, downloaded Apr. 27, 2005.

Kopp, John, About.com, C++ Tutorial—Lesson 9: Introduction to Classes, Defining Classes, htpp://cplus.about.com/od/beginnerctutorial/l/aa041002b.htm, downloaded Apr. 27, 2005.

Patent Cooperation Treaty, International Search Report and Written Opinion of the International Searching Authority for PCT/US2005/015596, Apr. 5, 2006, 12 pages.

Sangyong Han et al., Web Based rSPC (realtime Statistical Process Control) System Supporting XML Protocol, Industrial Electronics, Jun. 2001, pp. 399-403, Piscataway, New Jersey.

Patent Cooperation Treaty, International Search Report and Written Opinion of the International Searching Authority for PCT/US2005/015439, Aug. 10, 2005, 12 pages.

Patent Cooperation Treaty, International Search Report and Written Opinion of the International Searching Authority for PCT/US2005/015394, Mar. 20, 2006, 15 pages.

D. Chen, Real-Time Management in the Distributed Environment, Ph.D. Thesis, 1999.

Patent Cooperation Treaty, International Search Report and Written Opinion of the International Searching Authority for PCT/US2005/015585, May 9, 2006, 14 pages.

Developers.sun.com, Core J2EE Patterns—Data Access Object, http://web.archive.org/web/20040414043406/java.sun.com/blueprints/corej2eepatterns/Patterns/DataAccessObject.html, Apr. 14, 2006, 10 pages.

Mohr S et al, BizTalk and Application Integration—Translating Between Message Specification: BizTalk Mapper, Professional BizTalk, Apr. 14, 2001, 3 pages.

W3C, XSL Transformations (XSLT), Version 1.0, W3C Recommendation, Nov. 16, 1999, 11 pages.

Nixon, Mark et al., U.S. Appl. No. 10/575,173, filed Apr. 7, 2006 for "Graphic Display Configuration Framework for United Process Control System Interface."

Chinese Intellectual Property Office issued on Jan. 8, 2010, Decision of Rejection (English Translation) in Chinese patent application No. 200580014498.6, 25 pages.

Notice of Reasons for Rejection, issued by the Japanese Patent Office, in connection with Japanese application No. 2007-511583, on Feb. 3, 2011, 5 pages.

Han et al., "Web Based rSPC (realtime Statistical Process Control) System Supporting XML Protocol," Computer Engineering Department, Korea, 2001, 5 pages.

Europe Search Report, issued by the European Patent Office in connection with European Application No. 10012847.9-2201, on Jan. 27, 2011, 8 pages.

Europe Office Action, issued by the European Patent Office in connection with European Application No. 10012847.9-2201, on Jan. 25, 2011, 10 pages.

Europe Search Report, issued by the European Patent Office in connection with European Application No. 10012848.7-2201, on Jan. 27, 2011, 7 pages.

State Intellectual Property Office of P.R. China, Office Action, issued for Chinese Patent Application No. 201110021372.9, on Aug. 24, 2011, (12 pages).

* cited by examiner

FIG. 9D

METHODS AND APPARATUS FOR MODIFYING PROCESS CONTROL DATA

RELATED APPLICATION

This patent is a continuation of International Application Serial Number PCT/US2005/015596, entitled "Methods and Apparatus for Modifying Process Control Data" filed on May 4, 2005, which claims the benefit of provisional U.S. Patent Application No. 60/567,980, filed May 4, 2004, which is hereby incorporated by reference herein in its entirety.

FIELD OF THE DISCLOSURE

The present disclosure relates generally to processor control systems and, more particularly, to process control apparatus and methods for modifying process control data.

BACKGROUND

Process control systems, like those used in chemical, petroleum or other processes, typically include one or more centralized process controllers communicatively coupled to at least one host or operator workstation and to one or more field devices via analog, digital or combined analog/digital buses. The field devices, which may be, for example, valves, valve positioners, switches and transmitters (e.g., temperature, pressure and flow rate sensors), perform functions within the process such as opening or closing valves and measuring process parameters. The process controller receives signals indicative of process measurements made by the field devices and/or other information pertaining to the field devices, uses this information to implement a control routine and then generates control signals that are sent over the buses or other communication lines to the field devices to control the operation of the process. Information from the field devices and the controllers may be made available to one or more applications executed by the operator workstation to enable an operator to perform desired functions with respect to the process, such as viewing the current state of the process, modifying the operation of the process, etc.

Process control systems are typically configured using configuration applications that enable a system engineer, operator, user, etc. to define how each field device within a process control system should function for a particular process (e.g., a particular chemical production process). When a field device is added to a particular process or each time a change is made to the process, an engineer may generate a new control program or new configuration data or may update or modify an existing control program. Each process may use a large number of field devices, controllers, and/or other control devices and, thus, a control program may include large amount of configuration data. Some known process control systems provide integrated editors that enable users to create and/or update control programs. However, these known programs typically display data in a manner that does not reveal how process control data associated with one field device relates to the process control data of another field device. Furthermore, the underlying database infrastructure does not show the set of relationships between the control system, the process, material flows and compositions, equipment, devices, and the operational displays that are used to operate, maintain, and diagnose the overall system. In other words, these known editors typically show process control data without revealing its relationship to the overall system. As used herein, the term "process control data" includes the control system, the process material flows and compositions, equipment, devices, and the operational displays that are used to operate, maintain, and diagnose the overall system. Further, creating or updating control programs using known editors is often cumbersome because it is difficult for an engineer or other user to keep a system diagram in view or in the user's memory while working with the relatively abstract view provided by the editor interface. As a result, the engineer or other user often needs a detailed printout of each portion of the process control system and then refers to the multiple printouts when using the editor.

Known editors also typically require a user to utilize an on-site workstation. An engineer may often desire to create or update a control program while remotely situated from an on-site process control system workstation. However, creating or updating a control program while remotely situated from the process control system often requires a full installation of a process control system application on a portable or remotely located computer. However, the number of full application installations is usually limited to the number of available software licenses, mobile computing power, and/or budget constraints. Even when the full application does not have to be installed, the relationship between the data, equipment, devices, processes, materials, and displays is not available.

As newer, improved process control system applications become available, companies may upgrade their older process control system applications. Upgrading or migrating to different process control system applications is often tedious because of incompatibilities between older process control system applications and newer process control system applications or incompatibilities among process control system applications provided by different vendors. For example, data formats may differ between different process control system applications. As a result, migrating existing process control data often requires engineers to migrate the data manually or to develop custom scripts or programs that can convert prior custom data to data that is formatted suitable for use with the new process control system applications.

SUMMARY

Example methods and systems for modifying process control system data are disclosed herein. In accordance with one example, a method of modifying process control data involves obtaining the process control data in an extensible markup language (XML) format and converting the process control data from the XML format to a second data format. The process control data may then be stored in a database and subsequently edited by retrieving the process control data from the database, modifying the process control data, storing the modified process control data in the database, converting the modified process control data from the second data format to the XML format, and storing the modified process control data in the XML format.

In accordance with another example, a method may be used to obtain the process control data in a first data format from a database. The process control data is then converted from the first data format to an XML format and output via a user interface. At least one modified process control data value associated with the process control data is obtained and converted from the XML format to the first data format and stored in the first data format in the database.

In accordance with yet another example, a system for modifying process control data includes at least one editor to edit the process control data. The system may also include a database to store the process control data in a first data format. A database interface may be communicatively coupled to the editor and the database to communicate information between the editor and the database. A data converter may be communicatively coupled to the editor and the database to convert the process control data from the first data format to an XML format.

In accordance with yet another example, a system for modifying process control system data includes a database configured to store the process control data and a database server communicatively coupled to the database to access the process control data in the database. A query builder may be communicatively coupled to the database server and configured to generate queries and communicate the queries to the database server to enable the database server to retrieve the process control data from the database based on the queries. A data interface may be communicatively coupled to the query builder and configured to import or export the process control data in an extensible markup language format.

BRIEF DESCRIPTION OF THE DRAWINGS

FIGS. 9A-9D illustrate a sequential development of a spreadsheet document using the spreadsheet editor interface display of FIG. 7 to view and modify process control data.

DETAILED DESCRIPTION

Figure 1:
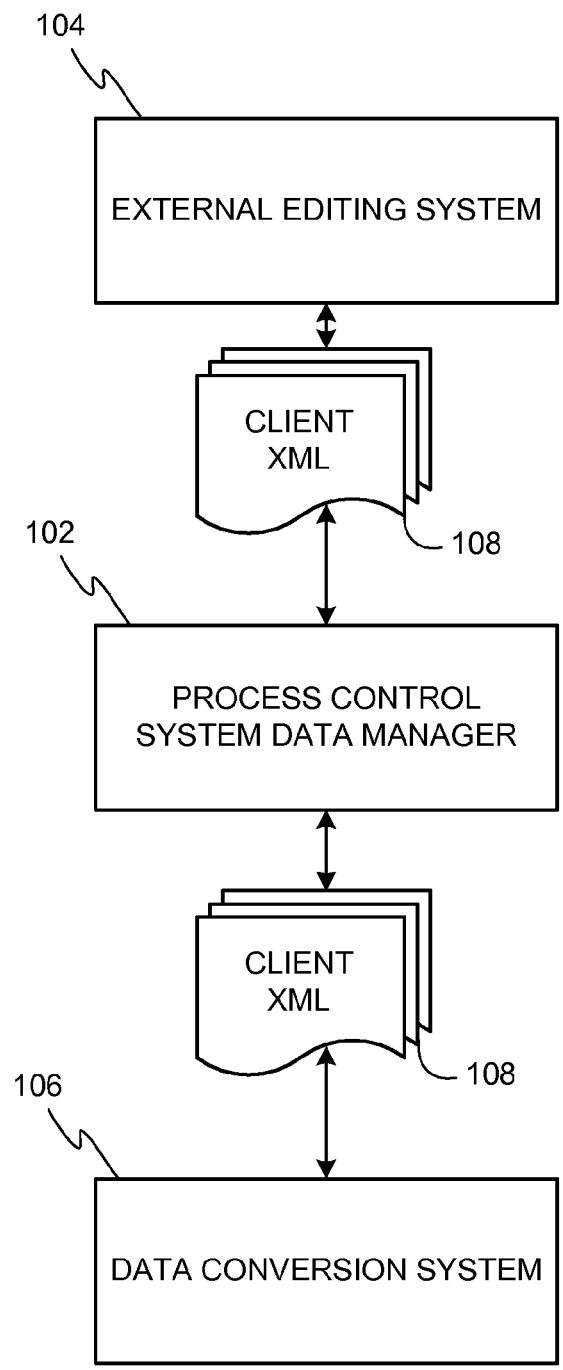
FIG. 1 is a block diagram illustrating an example process control system data manager, an example external editing system, and an example data conversion system, all of which may be used with a process control system.

Although the following discloses example systems including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the following describes example systems, persons of ordinary skill in the art will readily appreciate that the examples provided are not the only way to implement such systems.

In contrast to known systems that allow process control data to be modified using only editors that are integrated with a process control system application, the example apparatus, methods, and articles of manufacture described herein may be used to modify process control data using any of a plurality of editors that are integrated with process control software applications or that are external and function independently of process control software applications. Process control data can be exchanged (e.g., imported and exported) between a process control system data manager and editors (e.g., external editors, integrated editors, etc.) in a common data format or data organization such as an extensible markup language (XML) format. In contrast to known systems, the example apparatus, methods, and articles of manufacture described herein enable using any editor capable of obtaining process control data in the common data format to import the process control data from the process control system data manager, view and edit or modify the process control data, and subsequently export the modified data to the process control system data manager. Unlike known systems that tie a user to a workstation terminal that is connected to a process control system, an example external editing system may be used to view and/or modify the process control data while away or disconnected from the process control system.

The example apparatus, methods, and articles of manufacture also enable a user to specify the particular process control data of interest to the user and the format or organization of the process control data. The format or organization of the process control data is specified via a client XML schema, which serves as the common data format or organization for exchanging the process control data between the process control system data manager and editors. In other words, client schemas are used as the standard, agreement, or contract for formatting or organizing process control data and exchanging the data between the process control system data manager and editors (e.g., external editors, internal editors, etc.).

The examples described herein are configured to enable the modification of the process control data by converting the process control data between data formats associated with the editors and the common data format or organization that is universally compatible with a plurality of database systems so that the process control data can be exchanged or conveyed between process control software applications and editors. This enables system engineers to edit process control data using any of a plurality of editors, some of which function independent of a process control application, so that system engineers can modify process control system configurations when working remotely from process control system workstations. For example, system engineers may import/export or otherwise exchange process control data between process control applications and external editors using a data format such as, for example, XML, which is compatible with a plurality of data editors.

The example apparatus, methods, and articles of manufacture described herein enable a system engineer or any other authorized user to edit process control data in a manner that is intuitive to the system engineer by displaying process control data in an intuitive arrangement that relates the process control data to other portions of the process control system. For example, the process control data can be displayed within graphical representations of the process control system. Process control data can alternatively or additionally be displayed alongside other related process control data by, for example, simultaneously displaying all process control data associated with a particular field device type (e.g., process control data for all valve actuators). In any case, the examples described in greater detail below enable a user to select data arrangements or layouts for viewing and modifying process control data.

The example apparatus, methods, and articles of manufacture described herein also enable editing a plurality of data simultaneously to quickly modify attributes common to a plurality of control devices. Exchanging data in a cross-compatible data format such as XML also enables system engineers to efficiently migrate process control data from older process control applications to newer or upgraded process control applications.

An example external editing system described below enables users (e.g., process control system engineer) to import process control data and edit the data using any of a plurality of external editors that function independently of a process control application execution environment. Specifically, in one example, a process control application is configured to retrieve process control data from a process control application database, convert the data to XML format based on a client schema, and export the XML data and corresponding client schema to a storage location specified by a user. The user may then import the XML data and client schema from the storage location into an external database associated with the external editing system to change or modify the process control data while away from the process control system (e.g., remotely situated from a process control system workstation) and then import the modified process control data into the process control application at a later time.

An example integrated editor described below is configured to enable an edit-in-place process by displaying the process control data within a graphical representation of a process control system (e.g., a process control system diagram). For example, the process control data may be embedded within a process control system diagram associated with an execution context of a process control system application. Specifically, the process control system application can show a graphical user interface screen having the process control data overlayed onto corresponding control devices, modules, and/or objects. A user can modify the process control data in an intuitively interactive manner by seeing where the control devices are located relative to other control devices within the process control system in addition to seeing control device identification codes or names and associated properties or attributes.

Another example integrated editor is a search and replace editor that enables the modification of process control data without retrieving existing process control data values from a process control system database. The search and replace editor enables a user to quickly update or generate process control data based on user-specified search and replace information including, for example, a device name, a property name, an existing value if necessary, a replacement value, etc. The replacement value is then stored throughout the process control system database based on the search and replace information.

Often, during process control system configuration or changes, large amounts of process control data need to be modified to configure control devices, modules, or objects for operation. The example editors described herein enable simultaneous editing or modification of a plurality of attributes that are common to a plurality of control devices, modules, or objects. For example, the flow rate of a plurality of pumps located throughout a process system can be modified simultaneously by selecting the plurality of pumps and modifying the value of the flow rate attribute of each of the pumps. Bulk editing the attributes of multiple control devices in this manner increases the efficiency and speed of configuring a process control system.

Now turning to FIG. 1, the example apparatus, methods, and articles of manufacture described herein may be implemented using an example process control system data manager 102, an example external editing system 104, and an example data conversion system 106. The example process control system data manager 102, the example external editing system 104, and the example data conversion system 106 are configured to exchange (e.g., import and export) process control data using a common data format or universally compatible data format such as, for example, XML, and a common data arrangement or organization defined in a client schema. For example, although each of the example process control system data manager 102, the example external editing system 104, and the example data conversion system 106 may be configured to work with process control data in a different data format, each of the entities 102, 104, and 106 may obtain and use or modify the same process control data by exchanging the process control data with one another as client XML data or client XML files 108. The client XML 108 includes the process control data and a client schema, which specifies the organization of the process control data. Each of the entities 102, 104, and 106 is provided with a data exchange engine or import/export interface configured to convert the process control data between the XML data format and one or more other data formats associated with each of the entities 102, 104, and 106. Although the common data format described herein is the XML data format, other common data formats may be used instead of or in addition to XML.

In the examples provided herein, the process control system data manager 102 is configured to work cooperatively with one or more process control system software applications. A process control system software application is used to automate control and management of process control systems used to implement, for example, chemical, petroleum or other processes. The process control system applications are communicatively coupled to controllers, control modules, field devices, and/or other control devices located throughout a process system. The process control system application manages the process control devices based on process control data that provides configuration information (e.g., property or attribute values, I/O configuration data, etc.) for each of the control devices.

To initialize a process system to implement a particular process, the process control system application obtains process control data from the process control system data manager 102 and initializes each control device associated with the process based on the process control data. The process control system data manager 102 is configured to use queries to provide process control data in response to data requests. The queries are used by the process control system data manager 102 as described below to retrieve only the data that is requested.

The process control system data manager 102 is also configured to store process control data and enables editing of the stored process control data. For example, the process control system data manager 102 is configured to store process control data associated with one or more process system configurations, each of which may be used to implement a different process. The process control system data manager 102 may also include one or more internal editors that enable a user to view and edit process control data. The process control system data manager 102 may be integrated with or communicatively coupled to a process control system application. A more detailed description of the example process control system data manager 102 is provided below in connection with FIG. 2.

The external editing system 104 is configured to store the process control data in a database or other data store that functions independently of the process control system data manager 102. For example, the database or other data store can reside on a portable processor system (e.g., a laptop, a handheld personal digital assistant (PDA), etc.) and/or a removable storage medium. In this example, the database or other data store can be removably coupled to a network associated with a process control system so that the database or data store can be removed from the network after importing data from, for example, the process control system data manager 102. In this manner a system engineer can modify, view, and/or create the process control data while away (e.g., remotely situated) from a process control terminal or workstation.

The external editing system 104 may include or be configured to be communicatively coupled to one or more external data editing applications or external editors that enable a system engineer to view and modify or create the process control data stored by the external editing system 104. For example, after a system engineer installs machine readable and executable instructions that implement the external editing system 104 on a portable computer such as a laptop or a handheld PDA, the engineer may connect the portable computer to a network that is accessible by the process control system data manager 102. The system engineer may then export process control data from the process control system data manager 102 as the client XML data or files 108 and import the process control data into the external editing system 104 on the portable computer. The external editing system 104 may then convert the process control data from the XML format to another data format compatible with the external editing system 104. The system engineer may then remove the portable computer from the network and view and modify the process control data while away from (e.g., remote from, not in communication with, etc.) the process control system application using an external editor such as a word processor application, a spreadsheet application, a database application, an XML editor, etc. The system engineer may subsequently reconnect the portable computer to the network and export the modified process control data to the process control system data manager 102 for use in configuring a process control system. A more detailed description of the external editing system 104 is provided below in connection with FIG. 3.

The data conversion system 106 is configured to convert data from data formats associated with other process control system applications to the data format associated with the process control system data manager 102. For example, the data conversion system 106 may be used when migrating process control data from a legacy or other third party process control system application to a newer or current process control system application. The data conversion system 106 may be configured to operate as a two-way conversion system that converts process control data from a legacy or custom data format to XML and from XML to a legacy or custom data format. The data conversion system 106 exports process control data to the process control system data manager 102 by converting the data to the client XML 108 and storing the client XML 108 at a designated storage location. The process control system data manager 102 may then import the client XML 108 from the designated storage location and convert the process control data in the client XML 108 to a data format associated with (e.g., compatible with) the process control system data manager 102. In a similar manner, the process control system data manager 102 may export process control data as XML data that the data conversion system 106 can subsequently import and convert to, for example, a legacy data format. A more detailed description of the data conversion system 106 is provided below in connection with FIG. 4.

Figure 2:
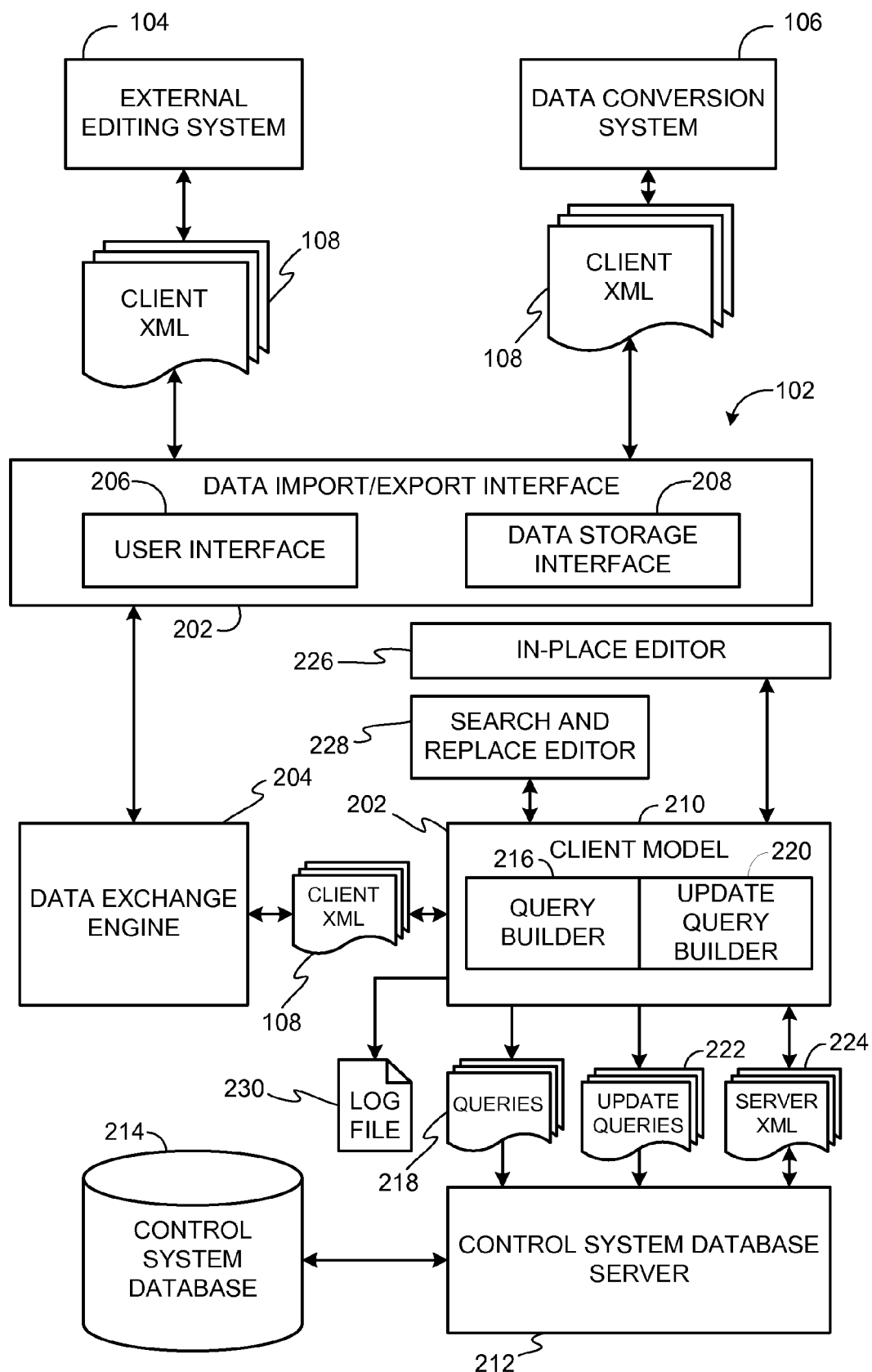
FIG. 2 is a detailed block diagram of the example process control system data manager of FIG. 1.
Figure 3:
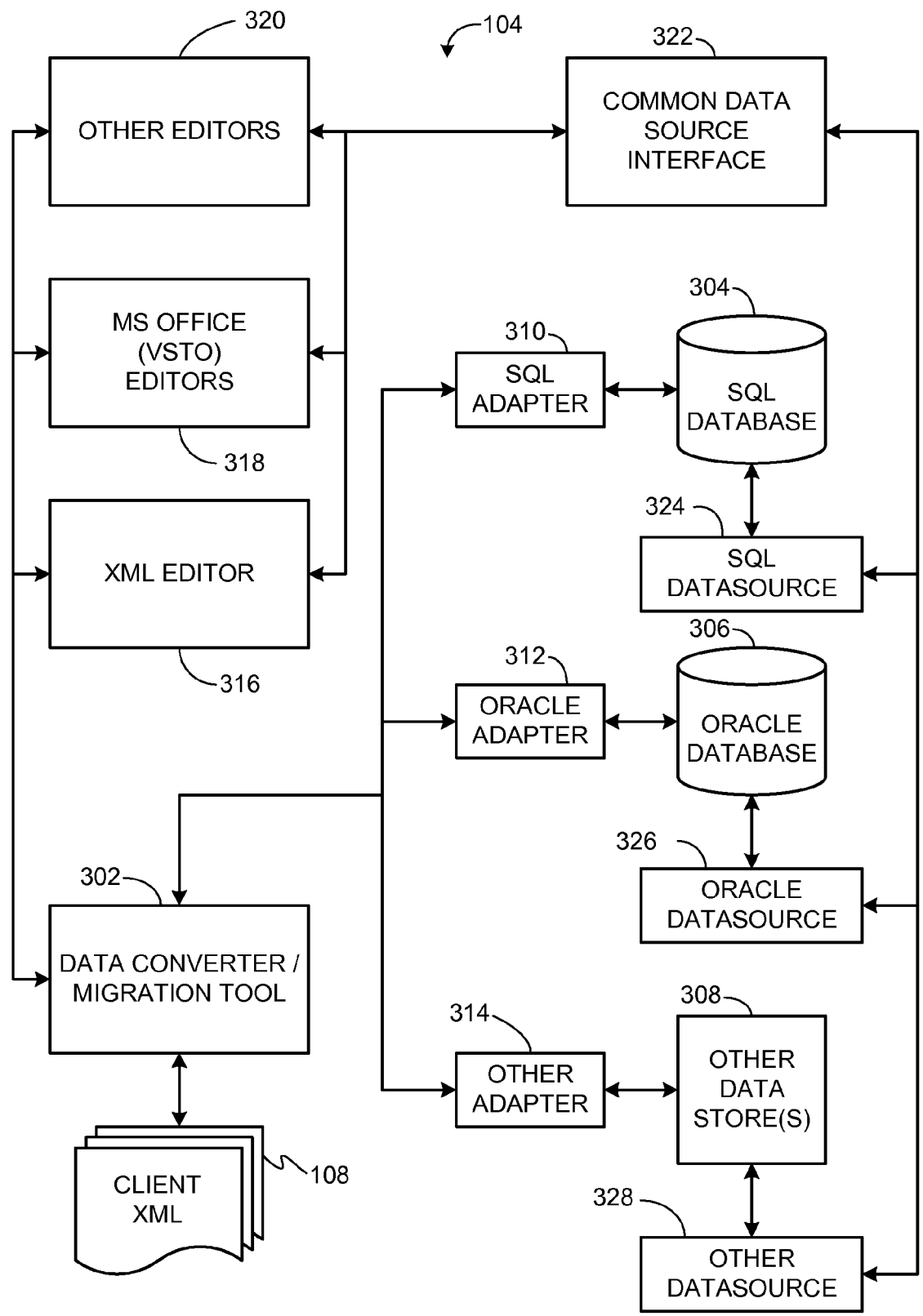
FIG. 3 is a detailed block diagram of the example external editing system of FIG. 1.
Figure 4:
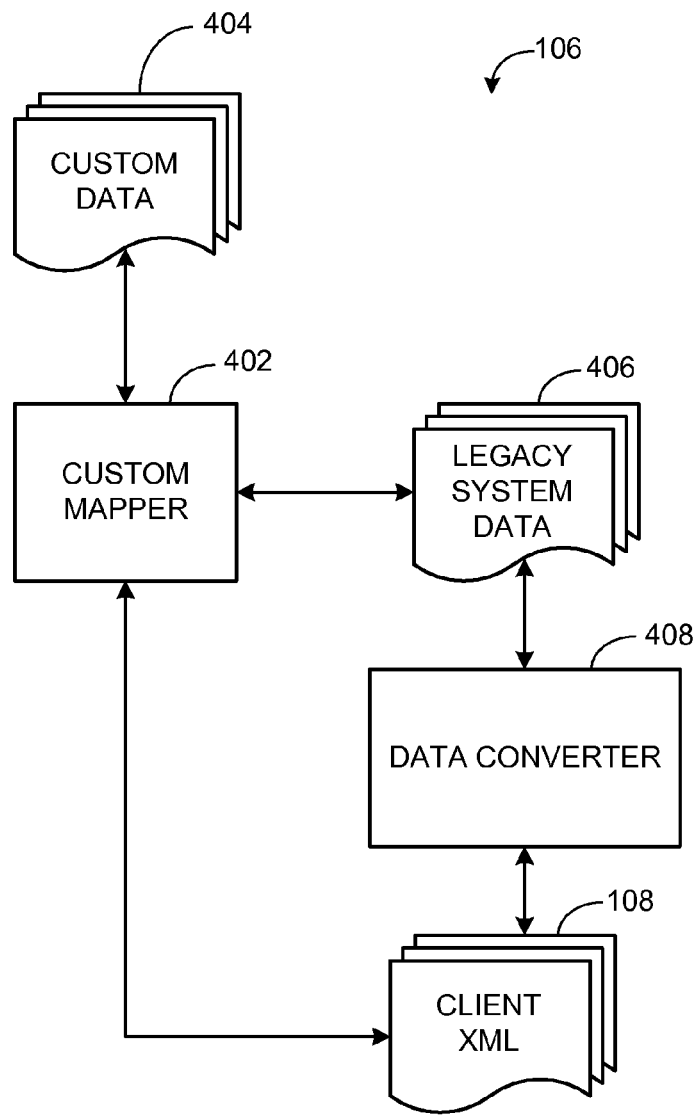
FIG. 4 is a detailed block diagram of the example data conversion system of FIG. 1.

The example structures shown in FIGS. 2-4 depicting the example process control system data manager 102, the example external editing system 104, and the example data conversion system 106 may be implemented using any desired combination of hardware and/or software. For example, one or more integrated circuits, discrete semiconductor components, or passive electronic components may be used. Additionally or alternatively, some or all, or parts thereof, of the example structures of FIGS. 2-4 may be implemented using instructions, code, or other software and/or firmware, etc. stored on a computer-readable medium that, when executed by, for example, a processor system (e.g., the processor system 2510 of FIG. 25), perform the methods described herein. Further, the example methods described below in connection with FIGS. 16-24 describe example operations or processes that may be used to implement some or all of the functions or operations associated with the structures shown in FIGS. 2-4.

FIG. 2 is a detailed block diagram of the example process control system data manager 102 of FIG. 1. As shown, the process control system data manager 102 exchanges process control data with the example external editing system 104 and the example data conversion system 106. To exchange the process control data with the external editing system 104 and the data conversion system 106, the process control system data manager 102 is provided with a data import/export interface 202 and a data exchange engine 204. The data import/export interface 202 includes a user-interface 206 and a data storage interface 208. The user interface 206 enables a user to interact with the data manager 102 and may be implemented using, for example, an import/export wizard application that displays a sequential set of graphical user interface screens providing a step-by-step process to guide a user in selecting or defining desired filtering criteria and data arrangement (i.e., a client schema). The filtering criteria are used to request process control data of interest so that only relevant process control data or the process control data of interest is exported. The data arrangement or client schema is used to organize or structure the process control data in the client XML 108. The data storage interface 208 is configured to store the client XML 108 in a storage location (e.g., a network drive, a portable computer storage device, etc.) designated by a user and to retrieve the client XML 108 from the designated storage location. The data storage interface 208 may be configured to access a particular type of file system (e.g., NTFS) or any other type of file or data storage system.

The data exchange engine 204 includes a plurality of data access objects that enable access to process control data associated with a plurality of control devices in a process control system. Each of the data access objects is configured to request and interact with process control data associated with a particular type of control device. For example, a first data access object may be configured to access process control data associated with pump control devices and a second data access object may be configured to access process control data associated with temperature sensor control devices. The data exchange engine 204 provides information to the data import/export interface 202 regarding the types of control device properties or attributes that are accessible and the types of filtering criteria available for accessing process control data. The data import/export interface 202 obtains user-provided filtering criteria and communicates the filtering criteria to the data exchange engine 204. The data exchange engine 204 then forwards process control data requests to a client model 210 via the software objects based on the filtering criteria.

To manage filtering criteria used to access and retrieve process control data and to generate the client XML 108, the process control system data manager 102 is provided with the client model 210, which is communicatively coupled to the data exchange engine 204 and a database server 212. The client model 210 is configured to request access to process control data using queries 218 that are generated based on filtering criteria. To generate the queries 218 based on the filtering criteria, the client model is provided with a query builder 216. For example, the client model 210 obtains the filtering criteria and configures the query builder 216 to generate the queries 218 based on the filtering criteria to obtain the requested process control data from a control system database 214 described below.

To update, store, or modify process control data values in the process control database 214, the client model 210 is provided with an update query builder 220. The update query builder 220 is used to generate update queries 222 any time modified process control data is communicated to the client model 210. Modified process control data may be obtained by the client model 210 from internal editors (e.g., an in-place editor 226 or a search and replace editor 228 described below) or may be imported to the process control system data manager 102 by the data import/export interface 202. The update queries 222 are used to identify modified process control data and store the modified process control data in corresponding entries of the control system database 214.

The client model 210 is also configured to convert the process control data to the client XML 108 after receiving the process control data from the control system database server 212. The control system database server 212 is communicatively coupled to the control system database 214 and retrieves the requested process control data from the control system database 214 based on the queries 218. The control system database server 212 then returns the process control data to the client model 210 as server XML data 224. The server XML 224 is structured or organized based on the data organization or schema of the control system database 214. To enable an editor and/or user to access and/or interact with the process control data, the client model 210 converts the server XML 224 into the client XML 108 based on the client schema and the filtering criteria provided by the user via the user interface 206. Specifically, the client model 210 arranges the process control data according to the client schema and stores the organized process control data, the client schema, and the filtering criteria in the client XML 108 for subsequent retrieval by an editor or user.

The control system database 214 is used to store process control data and may be implemented using any suitable type of database including, for example, a relational database, a structured query language database, etc. The control system database 214 stores the process control data in a data format that is associated with the type of database used to implement the control system database 214. For example, if the control system database 214 is an SQL database, the process control data is stored in the control system database 214 in an SQL data format. The database server 212 accesses the process control data stored in the control system database 214 based on the queries 218 and the update queries 222. The database server 212 converts the process control data from a database data format (e.g., an SQL data format) to the server XML 224 data format and communicates the server XML 224 to the client model 210.

If a user provides filtering criteria specifying flow rate data for all pump devices, the control system database server 212 accesses all entries in the control system database 214 associated with pump devices and retrieves flow rate data of the pump devices. If the process control system data manager 102 imports modified process control data, the update query builder 220 generates one of the update queries 222 describing the process control data that has been modified and the client model 210 communicates the update query to the control system database server 212. The control system database server 212 then stores the modified process control data in the control system database 214 based on the update query. Prior to storing modified process control data in the control system database 214, the control system database server 212 and/or the control system database 214 may utilize process control data rules to ensure that erroneous process control values are not stored in the database 214. The use of process control data rules is discussed in greater detail below in connection with the in-place editor 226. However, it should be recognized that, preferably, but not necessarily, the use of process control data rules by the in-place editor 226 is supplemental to the use of such rules by the database 214 and/or the database server 212.

To enable viewing and modifying process control data within a process control system diagram (e.g., the process control system diagram 1002 of FIG. 10A) the process control system data manager 102 is provided with an in-place editor 226. The in-place editor 226 enables a user to view the process control data within the context of a corresponding process system diagram and to modify the process control data without exporting the process control data to an external editor. The in-place editor 226 may generate and display graphical user interface displays or screens (e.g., the example in-place editor interface display 1000 of FIG. 10A) or may work cooperatively with a process control system application to provide in-place editing functionality to a process control system application editor. In this manner, the process control system application can enable the modification of process control data within a control system diagram associated with an execution context of the process control system application.

The in-place editor 226 communicates with data fields embedded in a process control system diagram and requests process control data indicated by those data fields. The data fields may define a client schema that specifies how the client model 210 should organize process control data for the in-place editor 226. The in-place editor 226 requests the process control data by communicating the request to the client model 210, which generates one of the queries 218 to retrieve the requested process control data from the control system database 214. The in-place editor 226 also communicates modified process control data values to the client model 210 for updating the process control data in the control system database 214.

The in-place editor 226 may also obtain process control data rules associated with the process control data and compare modified process control data to the rules to ensure that erroneous process control data values are not stored in the control system database 214. Process control data rules may include threshold settings for particular process control data or may include formulas or functions to determine if modified values can be used with other settings or process control data values stored in the database 214. For example, each time a user modifies a process control data value, the in-place editor 226 may compare the modified value to one or more corresponding rules. If the in-place editor 226 determines, based on the comparison, that the modified value is not in accordance with one or more rules, the in-place editor 226 may alert the user via graphical feedback as described below in connection with FIG. 11B.

The process control system data manager 102 may also include a search and replace editor 228 to enable the editing or modification of process control data stored in the control system database 214. In this manner, a user can batch update process control data associated with a plurality of control devices without having to retrieve and display all of the process control data of interest. Specifically, the search and replace editor 228 enables a user to specify via a user interface (e.g., the search and replace interface 1500 of FIG. 15) one or more control devices, one or more properties of the control devices, and a value (e.g., a modified value) to replace existing values stored in the control system database 214 for the selected control devices and properties. The search and replace editor 228 may communicate the user-provided search and replace information to the client model 210 and the update query builder 220 may generate one or more of the update queries 222 based on the search and replace information. The process control system database server 212 the uses the update queries 222 to search the control system database 214 for the selected process control data and to replace existing values with the user-provided replacement values.

To store error messages associated with process control data, importing processes, or exporting processes, the client model 210 is configured to access a log file 230. The log file 230 may be stored on a computer terminal storage device or a network storage device and stores a list of error messages generated by the client model 210. For example, if the client model 210 determines that the data import/export interface 202 has imported invalid process control data, the client model 210 can generate an error message and store the error message in the log file 230.

FIG. 3 is a detailed block diagram of the example external editing system 104 of FIG. 1. The external editing system 104 is configured to import and/or export the client XML 108 that is exported and/or imported by the process control system data manager 102 as described above. To import and export the client XML 108, the external editing system 104 is provided with a data converter/migration tool 302. The data converter/migration tool 302 imports process control data by converting the process control data in the client XML 108 from the client XML format to another data format associated with a database, file system, or other data store used to store the process control data in the external editing system 104. The data converter/migration tool 302 exports the process control data by converting the process control data from the data format associated with the external editing system 104 to the client XML format and organizes the process control data based on a client schema. The converter/migration tool 302 then exports the converted process control data and the corresponding client schema as the client XML 108.

The data converter/migration tool 302 is communicatively coupled to a plurality of data stores to store the process control data. As shown in FIG. 3, the external editing system 104 may include a structured query language (SQL) database 304, an Oracle® database 306, and/or other data store(s) 308. The other data store(s) 308 may be, for example, a file system, a look-up table, a relational database, or any other suitable data store. The data converter/migration tool 302 communicates with each of the data stores 304, 306, and 308 via a storage adapter (e.g., an SQL adapter 310, an Oracle® adapter 312, other adapter(s) 314). To communicate with the SQL database 304, the data converter/migration tool 302 is communicatively coupled to the SQL database 304 via the SQL adapter 310. To communicate with the Oracle® database 306, the data converter/migration tool 302 is communicatively coupled to the Oracle® database 306 via the Oracle® adapter 312. To communicate with the other data store(s) 308, the data converter/migration tool 302 is communicatively coupled to the other data store(s) 308, via the other adapter(s) 314.

The adapters 310, 312, and 314 enable the data converter/migration tool 302 to communicate with the data stores 304, 306, and 308 by converting the process control data between a client schema organization and a database schema or other storage schema organization associated with the data stores 304, 306, and 308. For example, to store process control data in the SQL database 304, the data converter/migration tool 302 communicates the process control data and corresponding client schema (retrieved from the client XML 108) to the SQL adapter 310. The SQL adapter 310 then converts or re-organizes the process control data to the data organization associated with the SQL database 304 and stores the process control data in the SQL database 304. The SQL adapter 310 can also convert process control data retrieved from the SQL database 304 to the client schema organization when the data converter/migration tool 302 exports process control data. The schemas associated with the data stores 304, 306, and 308 may be different from the schema associated with the control system database server 212 and the control system database 214 of FIG. 2.

To enable modifying or editing the process control data, the external editing system 104 includes or is configured to be communicatively coupled to one or more editors. As shown in FIG. 3, the external editing system 104 includes an XML editor 316, Microsoft Office® editors 318, or any other suitable editors 320. The editors 316, 318, and 320 display the process control data in a layout that may be defined by a user as described below in connection with FIGS. 8A-9D. In this manner, a user may view and edit data common to a particular device control type (e.g., all pump controls) at the same time, view and edit data associated with a specific device control, or view and edit data associated with a selected portion of a process system.

The editors 316, 318, and 320 exchange process control data with one or more of the data stores 304, 306, and 308 via a common data source interface 322. The common data source interface 322 is communicatively coupled to an SQL datasource 324, an Oracle® datasource 326, and an other data store datasource 328, each of which provides access to the SQL database 304, the Oracle® database 306, and the other data store(s) 308, respectively. The common data source interface 322 and each of the datasources 324, 326, and 328 provide the editors 316, 318, and 320 with a data interface that is abstracted from the data stores 304, 306, and 308. For example, the common data source interface 322 may include a plurality of abstracted or general data access functions that the editors 316, 318, and 320 can use to access process control data in any of the data stores 304, 306, and 308. The common data source interface 322 translates or maps general data access functions to specific data access functions used to communicate data access requests to the datasources 324, 326, and 328. Because the general data access functions are not specific to any particular data store, the editors 316, 318, 320 can access process control data using the general data access functions regardless of the data store used to store the process control data.

The datasources 324, 326, and 328 include specific data access functions that enable the common data source interface 322 to access data in the data stores. The common data source interface 322 communicates data access requests via specific function calls to each of the SQL datasource 324, the Oracle® datasource 326, and the other data store datasource 328. Each of the datasources 324, 326, and 328 is configured to access (e.g., retrieve or store) process control data in a respective one of the data stores 304, 306, and 308 in response to data access requests received from the common data source interface 322.

FIG. 4 is a detailed block diagram of the example data conversion system 106 of FIG. 1. To map process control data from a custom data format to a legacy system data format or to an XML data format, the custom data conversion system 106 is provided with a custom mapper 402. As shown in FIG. 4, the custom mapper 402 is configured to receive process control data organized as custom data 404 or legacy system data 406. The custom data 404 includes process control data that is organized in a data format that is associated with a third party process control system application. The legacy system data 406 is organized in a data format associated with an older version of the process control system application configured to function with the process control system data manager 102 (FIG. 1). The custom mapper 402 maps the process control data from the custom data 404 or from the legacy system data 406 to a data format that can be imported by the process control system data manager 102. For example, the custom mapper 402 may convert the process control data to the XML format and export the client XML 108. The custom mapper 402 may also map the custom data 404 to the legacy system data 406. To convert process control data from the legacy system data 406 to the client XML 108, the custom data conversion system 106 is provided with a data converter 408.

The legacy system data 406 may be imported by a legacy process control system application and the client XML 108 may be imported by the process control system data manager 102.

Figure 5:
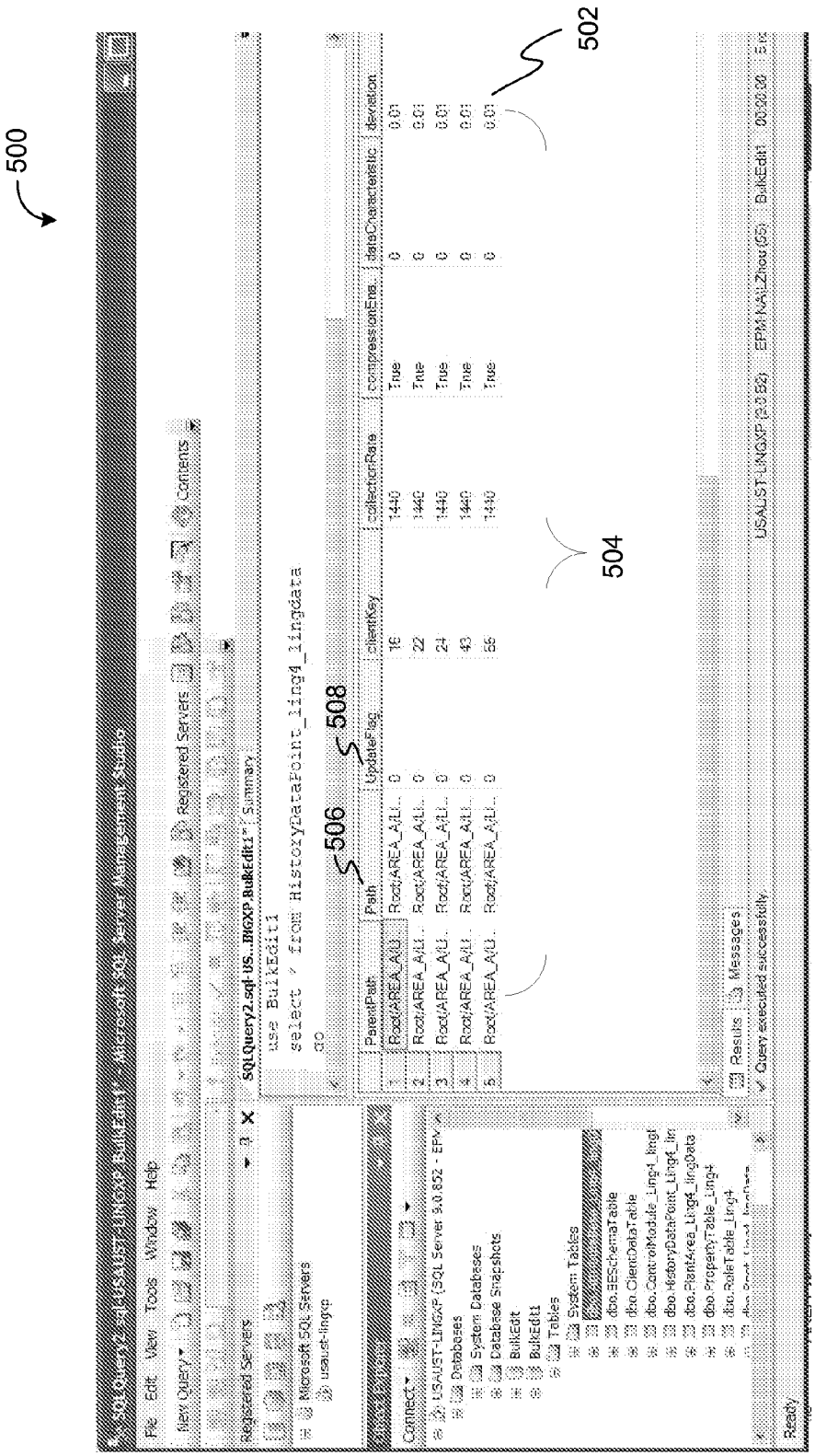
FIG. 5 is an example database interface display that may be used to access, view, and modify data stored in a database.

FIG. 5 is an example database interface display 500 used to interact with the SQL database 304 of FIG. 3. The database interface display 500 illustrates how process control data may be organized in the SQL database 304. The database interface display 500 enables access to the process control data for viewing and modifying the process control data and, thus, may be used as an external editor. As shown in FIG. 5, the process control data may be viewed in a table 502 comprising a plurality of columns 504, each of which includes a different attribute value for selected control devices. The plurality of columns 504 includes a path column 506 and an UpdateFlag column 508. The path column 506 indicates the location on a network or storage area in which the process control data for each selected control device is stored and is used during import/export processes to store and retrieve process control data requested by a user. The UpdateFlag column 508 indicates for each control device whether process control data for that device has been modified. During an import process to the process control system data manager 102 (FIG. 1), the client model 210 (FIG. 2) may determine which process control data has been modified based on the information shown in the UpdateFlag column 508.

Figure 6:
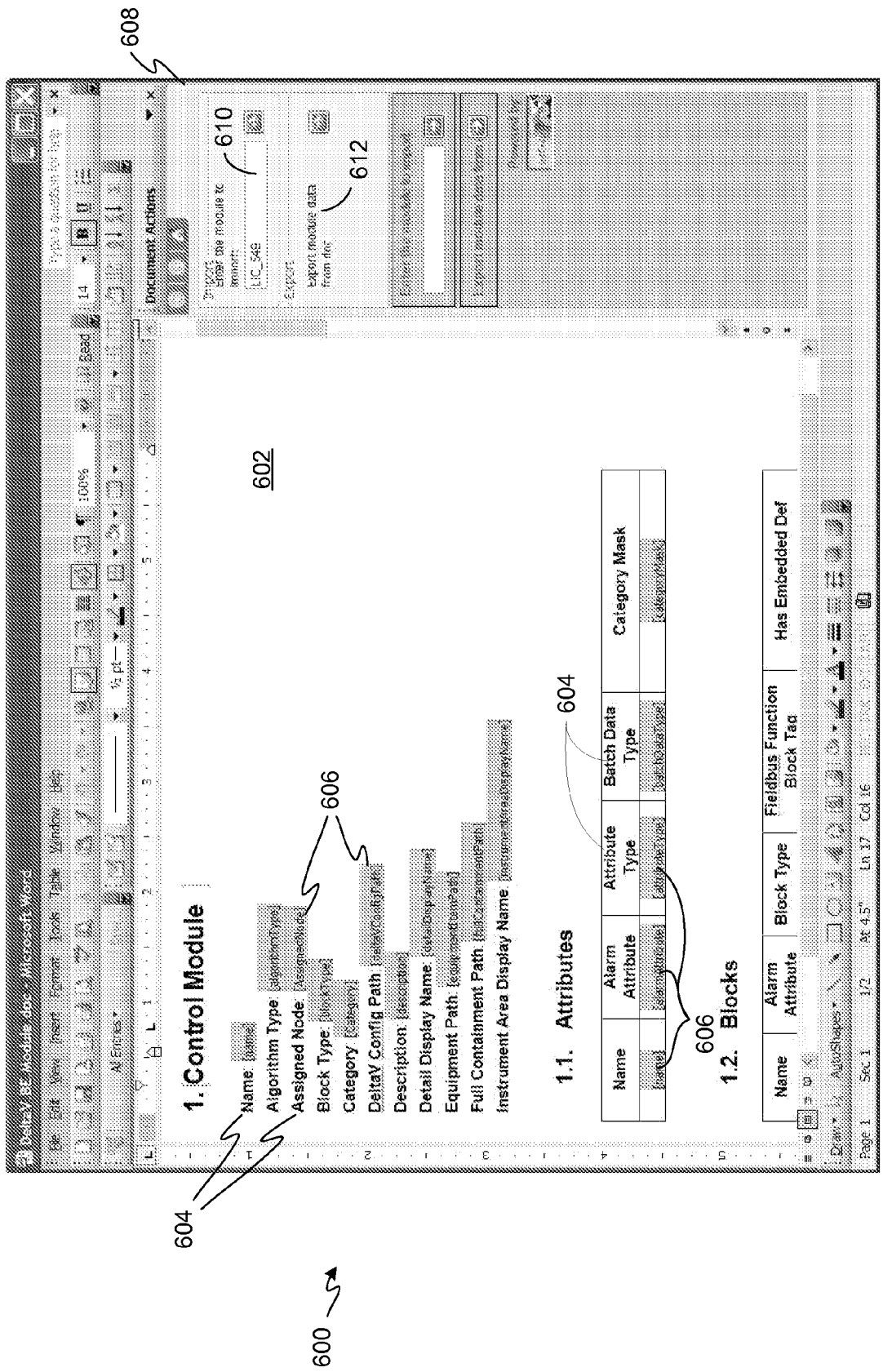
FIG. 6 is an example word processor editor interface display that may be used to view and modify process control data.

FIG. 6 is an example word processor editor interface display 600 used to modify process control data. The word processor editor interface 600 is used to implement one of the MS-Office® editors 318 of FIG. 3. The word processor editor interface 600 is shown as an MS-Word® application having an open word processor document file 602 that includes a plurality of process control data descriptors 604 and a plurality of data fields 606. The document file 602, which may be auto-generated by a predefined template, may be designed to display process control data in any desired visual layout. In FIG. 6, the example visual layout includes some process control data, which may be provided by the SQL database 304 (FIG. 3), organized as a list and some process control data organized in tables.

The visual layout of the document file 602 may be generated by adding the descriptors 604 anywhere in the document 602 and placing one of the data fields 606 adjacent to each of the descriptors 604. The data fields 606 include data linking functions that can be configured to access data in the data stores 304, 306, and 308 (FIG. 3). The data fields 606 may be configured to retrieve and/or store data associated with the process control data values of their corresponding descriptors 604. For example, if a process control data descriptor 604 includes the term "Name," a corresponding data field 606 will include data linking information regarding the location in a database from which the name of a selected control device can be retrieved and/or stored. The data fields 606 shown in FIG. 6 are implemented using a cross-application data linking tool such as, for example, the Visual Studio Tools for the Microsoft Office System (VSTO). Cross-application data linking tools may be used to exchange data between different software applications such as, for example, between a word processor application or a spreadsheet application and a database.

To select a control device for which to export or import process control data, the word processor editor interface display 600 includes a document actions tool panel 608. The document actions tool panel 608 includes an import selection tool 610 and an export selection tool 612. The import selection tool 610 can be used to select one or more of a plurality of control devices for which to import process control data.

For example, after selecting a control device via the import selection tool 610, the data fields 606 retrieve process control data associated with the selected control device from, for example, the SQL database 304. The export selection tool 612 can be used to select one or more of a plurality of control devices for which to export process control data.

Figure 7:
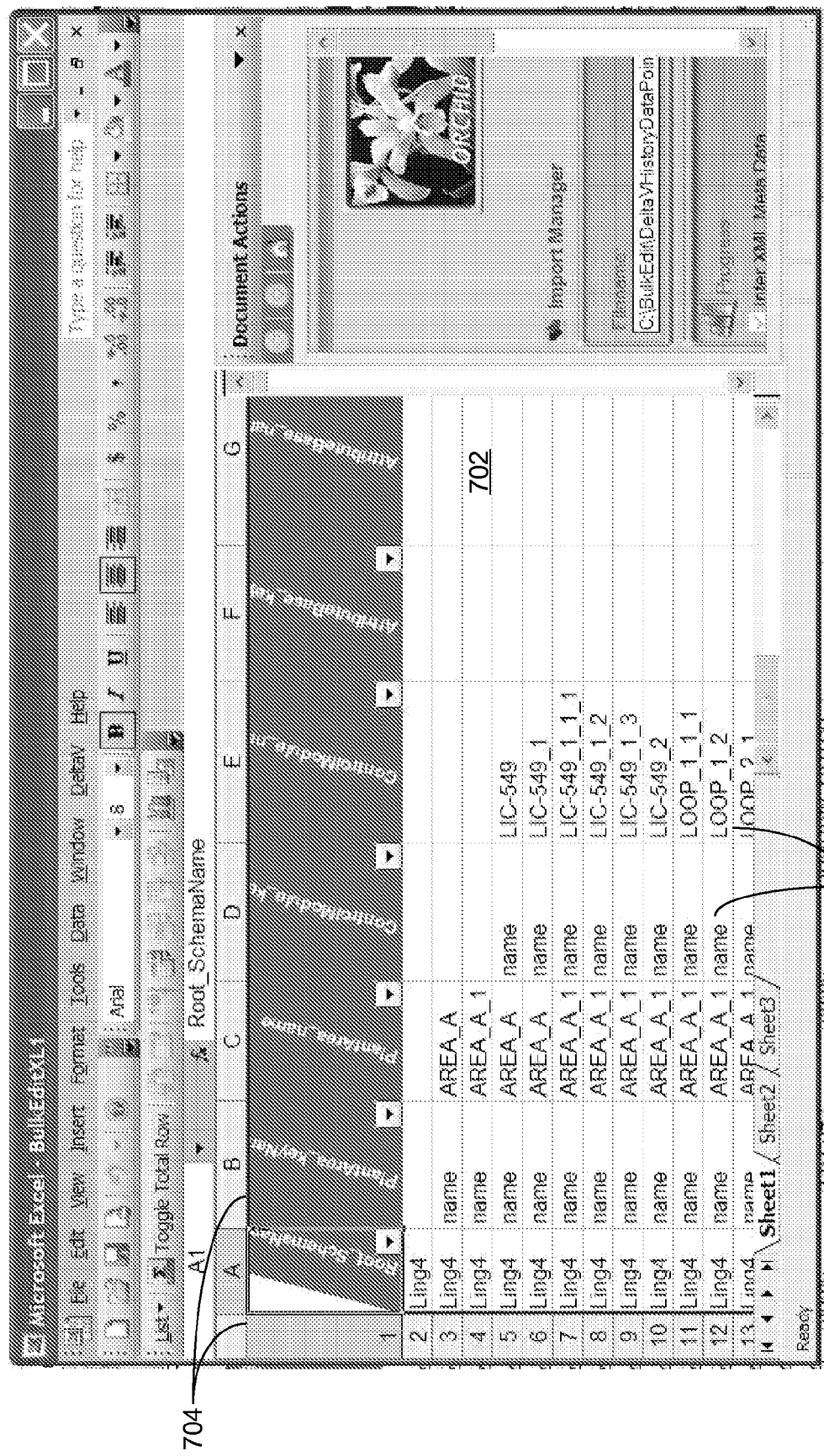
FIG. 7 is an example spreadsheet editor interface display that may be used to view and modify process control data.

FIG. 7 is an example spreadsheet editor interface display 700 used to modify process control data. To display process control data associated with selected control devices, the example spreadsheet editor interface display 700 includes a spreadsheet document file 702 having a plurality of columns 704, each of which corresponds to a particular parameter or attribute value of control devices. The columns 704 include a plurality of data fields 706 similar to the data fields 606 of FIG. 6 that access data in a database corresponding to selected control devices. The spreadsheet editor interface 700 also includes a document actions tool panel 708 that is substantially similar or identical to the document actions tool panel 608 of FIG. 6 and enables importing and exporting process control data.

Although not shown in FIGS. 6 and 7, a process system diagram (e.g., the process system diagram 1002 described below in connection with FIG. 10A) can be embedded in the word processor document file 602 and the spreadsheet document file 702. Data fields substantially similar or identical to the data fields 606 and 706 of FIGS. 6 and 7 can be overlaid onto the system diagram adjacent or on top of their respective control devices (e.g., the control device blocks 1004 of FIG. 10A).

Figure 8A:
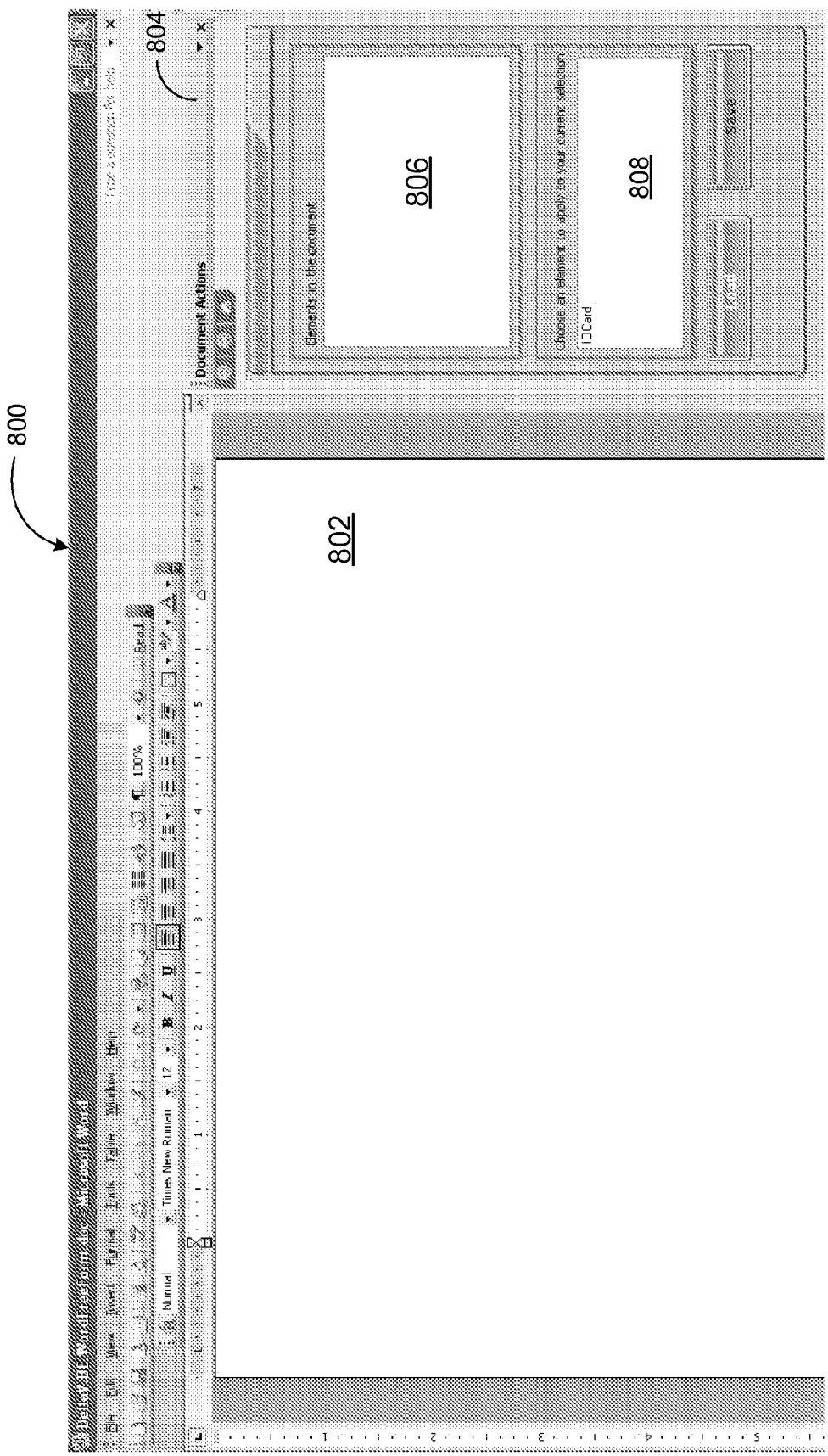
FIGS. 8A-8D illustrate a sequential development of a word processor document using the word processor interface display of FIG. 6 to view and modify process control data.

FIGS. 8A-8D illustrate an example word processor interface display 800 in a sequence that shows how a word processor document 802 may be designed to import and modify process control data using a word processor editor. A data layout may be configured to show the process control data that a user desires to view and/or modify for selected control devices. In some cases, the data layout and the process control data specified by a user may be used by the external editing system 104 and/or the word processor editor to generate a client schema that can be used to exchange the desired process control data with the process control system data manager 102. The word processor document 802 may be created once during a design phase as described below and subsequently used one or more times to access process control data selected during the design phase of the document 802. As shown in FIG. 8A, an MS-Word word processor application is used to open or create the document 802. The document 802 is used to create a process control data modifying interface as described below using a plurality of textual descriptors (e.g., the process control data descriptors 604 of FIG. 6) and a plurality of data fields (e.g., the plurality of data fields 606 of FIG. 6). The editor interface display 800 includes a document actions tool bar 804 showing a currently selected elements dialog 806 and an available elements dialog 808. The currently selected elements dialog 806 indicates which control devices and associated process control data are currently displayed in the document 802. The available elements dialog 808 shows the available control devices from which a user may select. After a user selects a control device from the available elements dialog 808, the selected control device appears in the currently selected elements dialog 806.

Figure 8B:
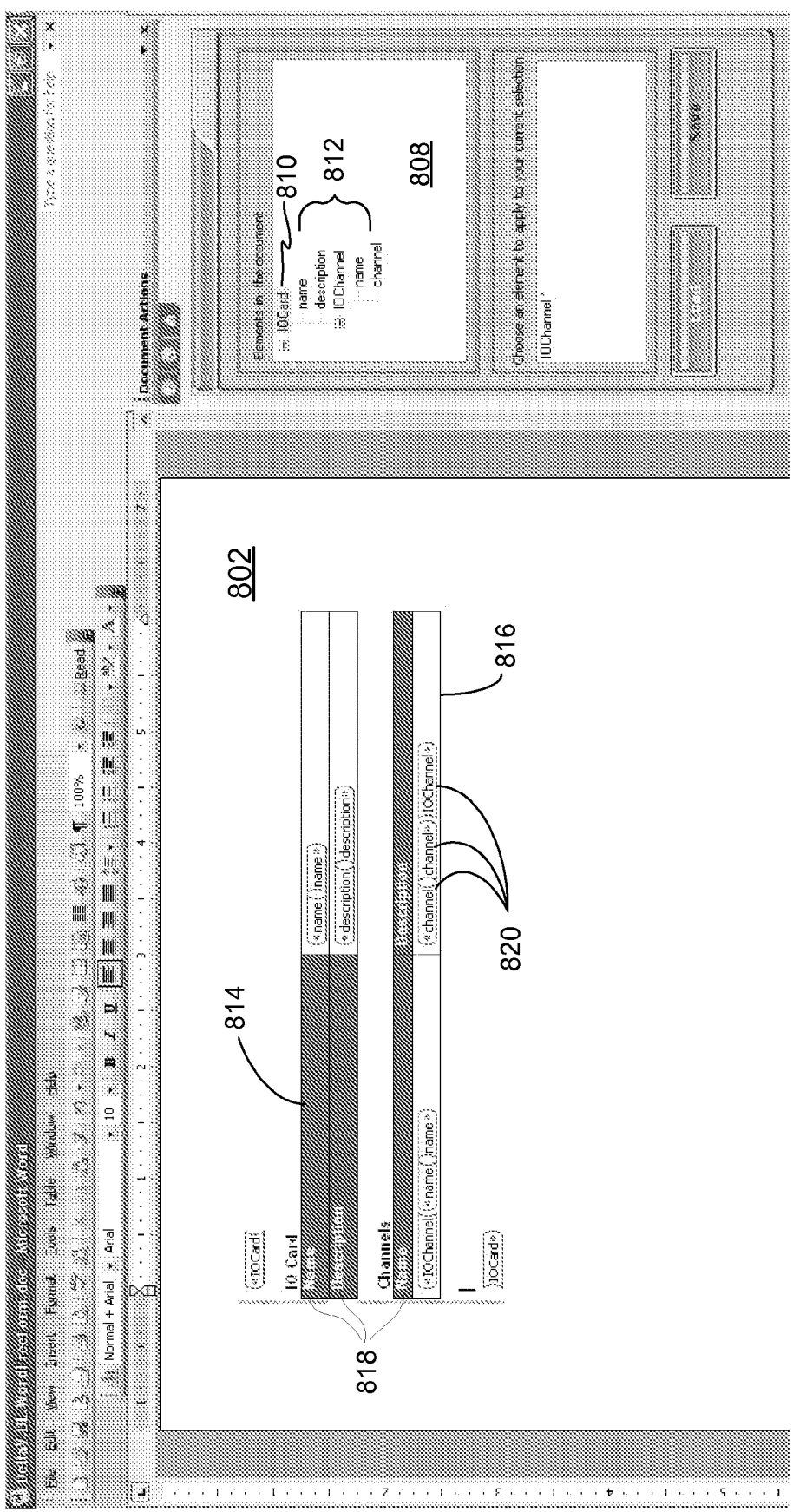

FIG. 8B illustrates the document 802 and the example editor interface display 800 after a control device has been selected. The selected control device is an I/O Card 810 that is shown in the currently selected dialog 808. The information presented in the dialog 808 may be derived from the client schema, which is stored in the client XML 108 (FIG. 2) as described above. An expanded view of the I/O Card 810 shows corresponding process control data labels 812 that can be imported into the document 802. The process control data labels 812 correspond to the process control data values shown in the plurality of rows 504 of FIG. 5. To view and modify the process control data associated with the selected I/O Card 810, the document 802 includes an I/O Card table 814 and a channels table 816. The tables 814 and 816 include process control data descriptors 818 that are substantially similar or identical to the process control data descriptors 604 of FIG. 6. The tables 814 and 816 also include a plurality of data fields 820 that are substantially similar or identical to the data fields 606 of FIG. 6. Each of the data fields 820 corresponds to one of the process control data values 812.

Figure 8C:
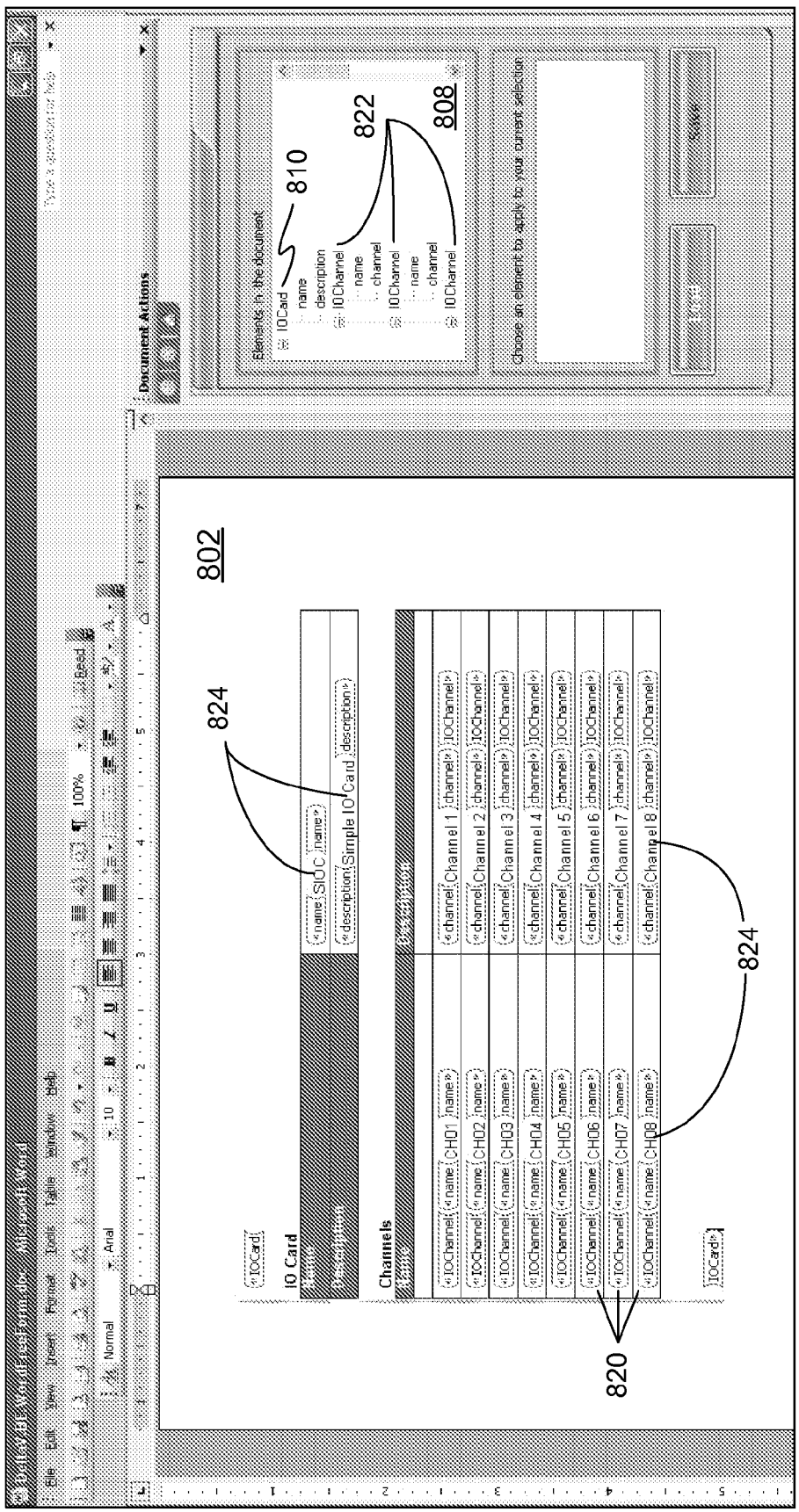
Figure 8D:
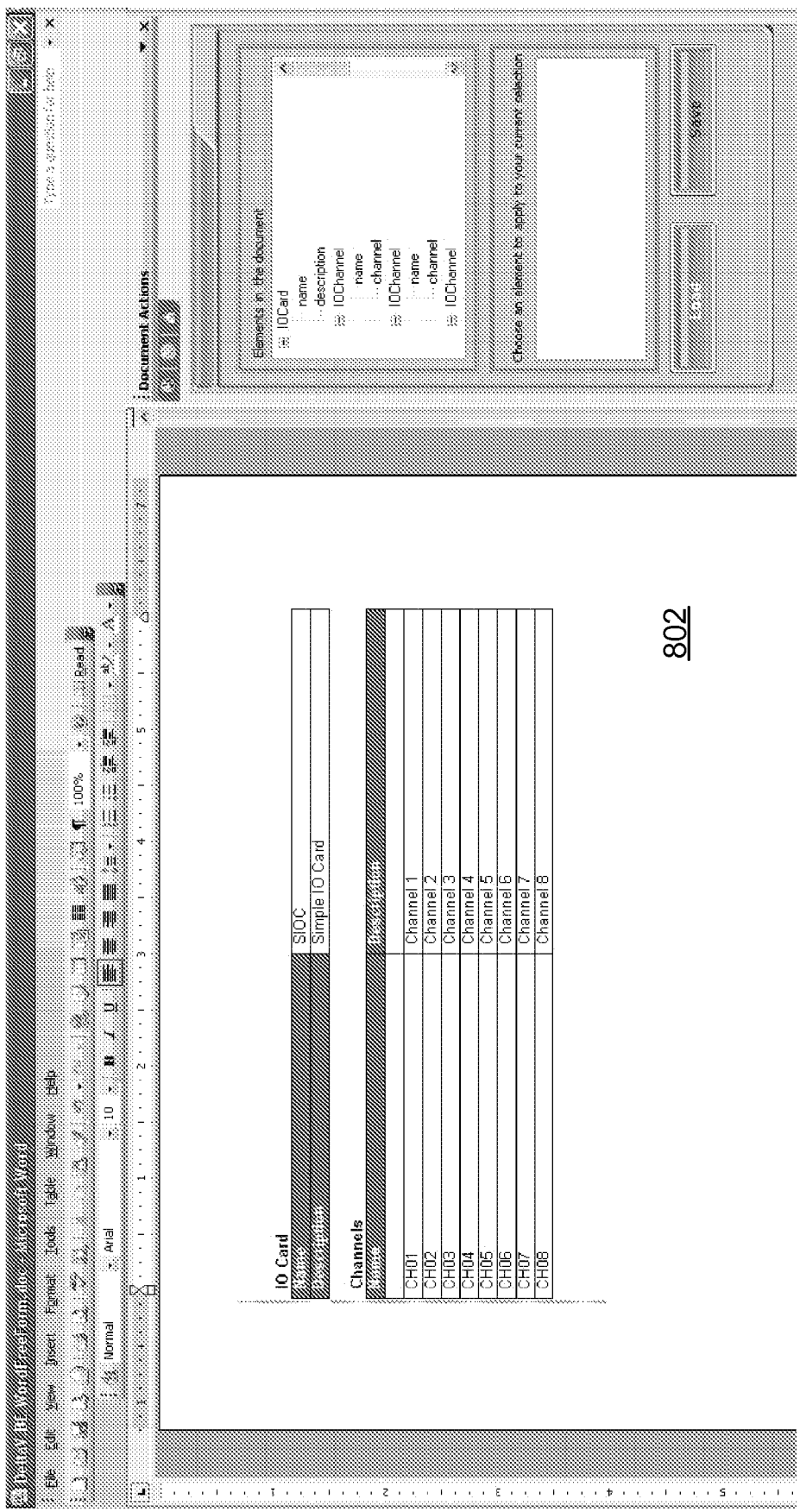

FIG. 8C illustrates the document 802 after a plurality of process control data has been added. As shown in the currently selected dialog 808, a plurality of I/O channels 822 has been added to the I/O Card 810. Each of the I/O channels 822 corresponds to a physical channel of the I/O Card 810 and is used to monitor data acquired by that I/O channel. Each of the data fields 820 corresponds to one of the I/O channels 822. The document 802 also includes process control data values 824 imported by the data fields 820 from, for example, the SQL database 304. After storing the document 802 and when a user subsequently opens the document to view and modify the selected process control data, the document 802 may be displayed without showing the data fields 820 as illustrated in FIG. 8D. In this case, the data fields 820 work in the background to import/export the selected process control data while the document 802 is open.

FIGS. 9A-9D illustrate an example spreadsheet interface display 900 in a sequence that shows how a spreadsheet document 902 may be configured to import and modify process control data using a spreadsheet editor. The spreadsheet editor shown in FIGS. 9A-9D is an MS-Excel® spreadsheet application. However, any other suitable spreadsheet application may be used. The example spreadsheet interface display 900 includes a spreadsheet document 902 and a document actions tool panel 904. The spreadsheet document 902 may be generated once during a design phase and saved for subsequent retrieval when a user desires to view or modify process control data. In some cases, a data layout and process control data specified by a user via the spreadsheet interface display 900 may be used by the external editing system 104 and/or the spreadsheet editor to generate a client schema that can be used to exchange the desired process control data with the process control system data manager 102.

The spreadsheet document 902 is used to show and modify process control data. The document actions tool panel 904 includes a data manager interface 906 and a legend 908. The data manager interface 906 is used to select the process control data to be imported into the document 902. Specifically, the data manager interface 906 includes a user-queries drop down list control 910 that can be used to select the types of control devices of interest. The legend 908 includes color-coded data status indicators. Specifically, the legend 908 includes a modified indicator 912, a new indicator 914, and a help available indicator 916. The color-coded indicators 912, 914, and 916 may correspond to font colors, data cell border color, or data cell background colors to indicate additional information about the process control data in the spreadsheet document. For example, the modified indicator 912 indicates that a process control data value has been modified, the new indicator 914 indicates that a process control data value is new, and the help available indicator 916 indicates that help information is available for a process control data value. The help information may include a set of preconfigured items, which may be selected by one or more users, stored in the configuration database.

Figure 9A:
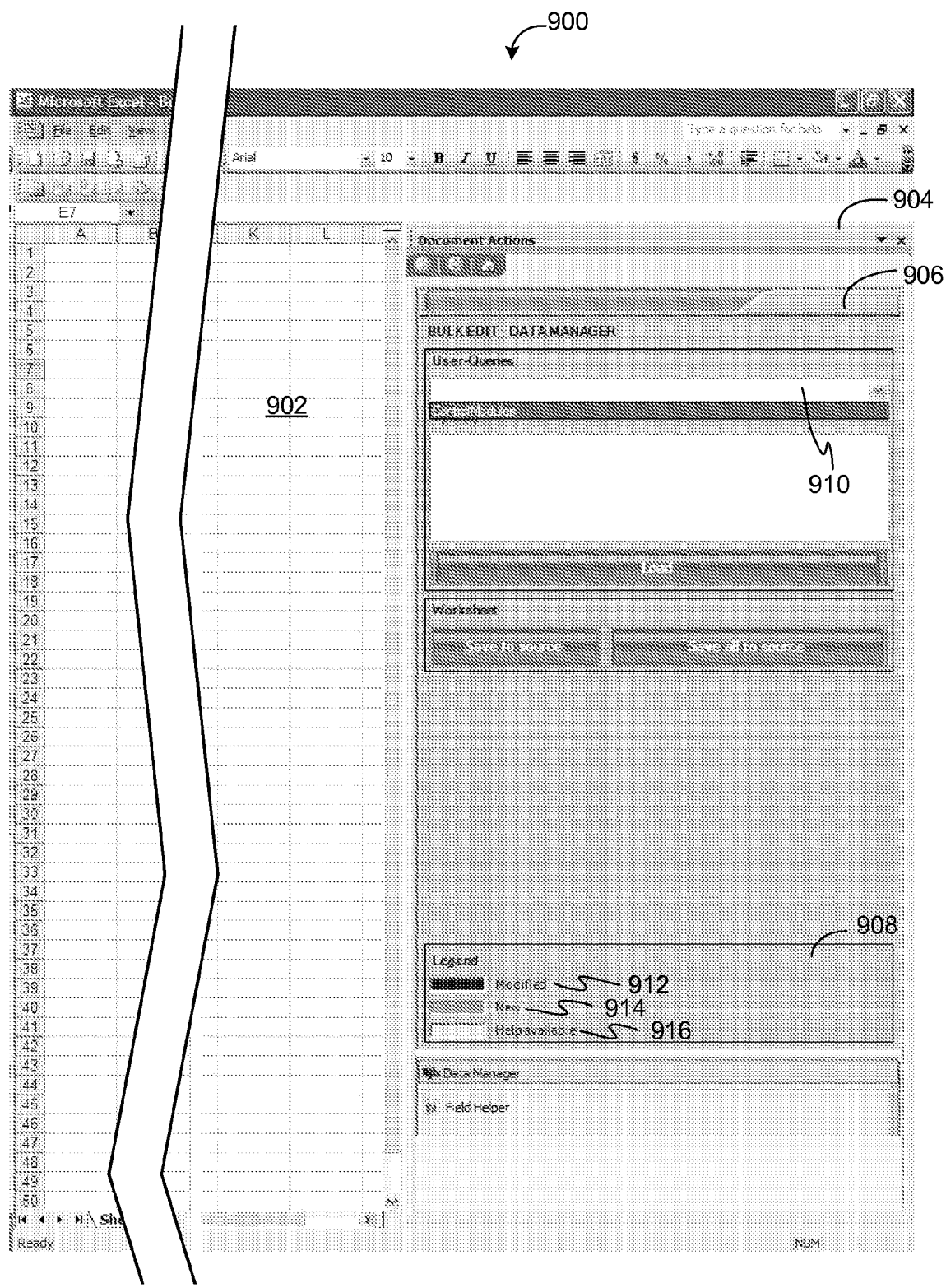
Figure 9B:
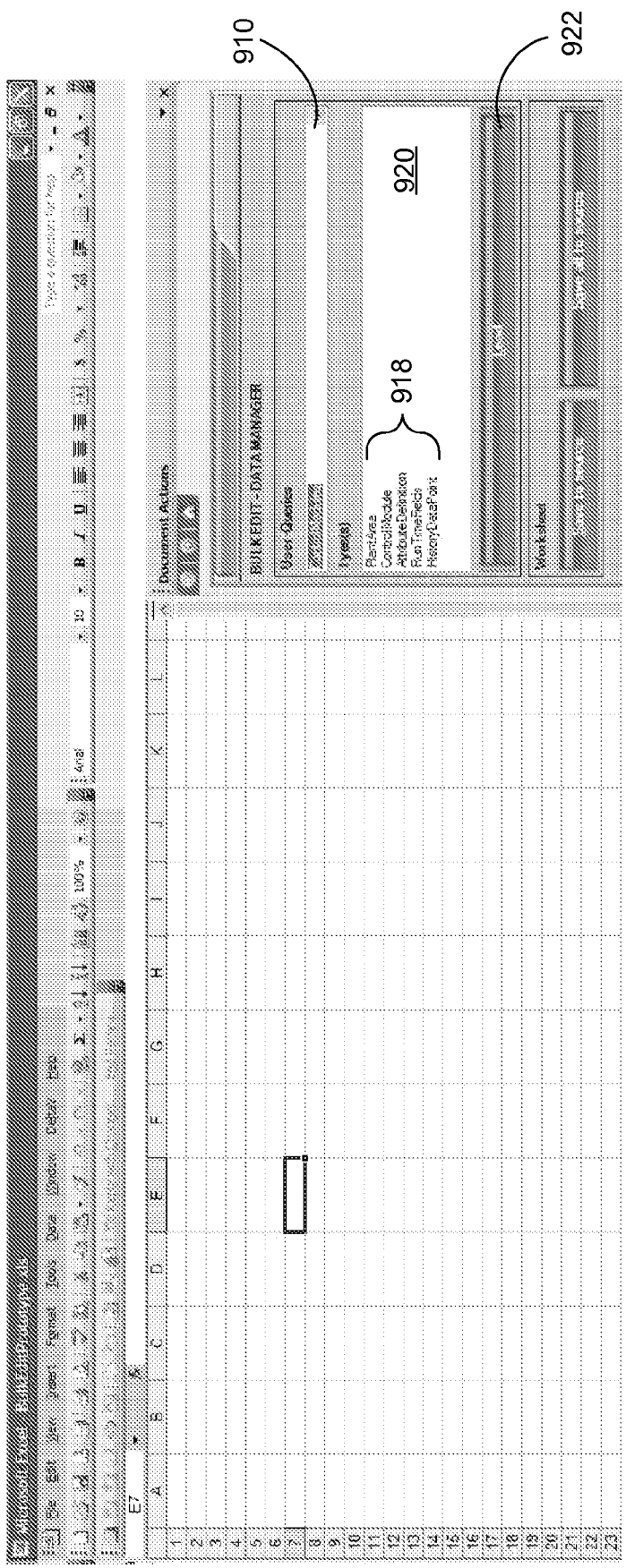
Figure 9C:
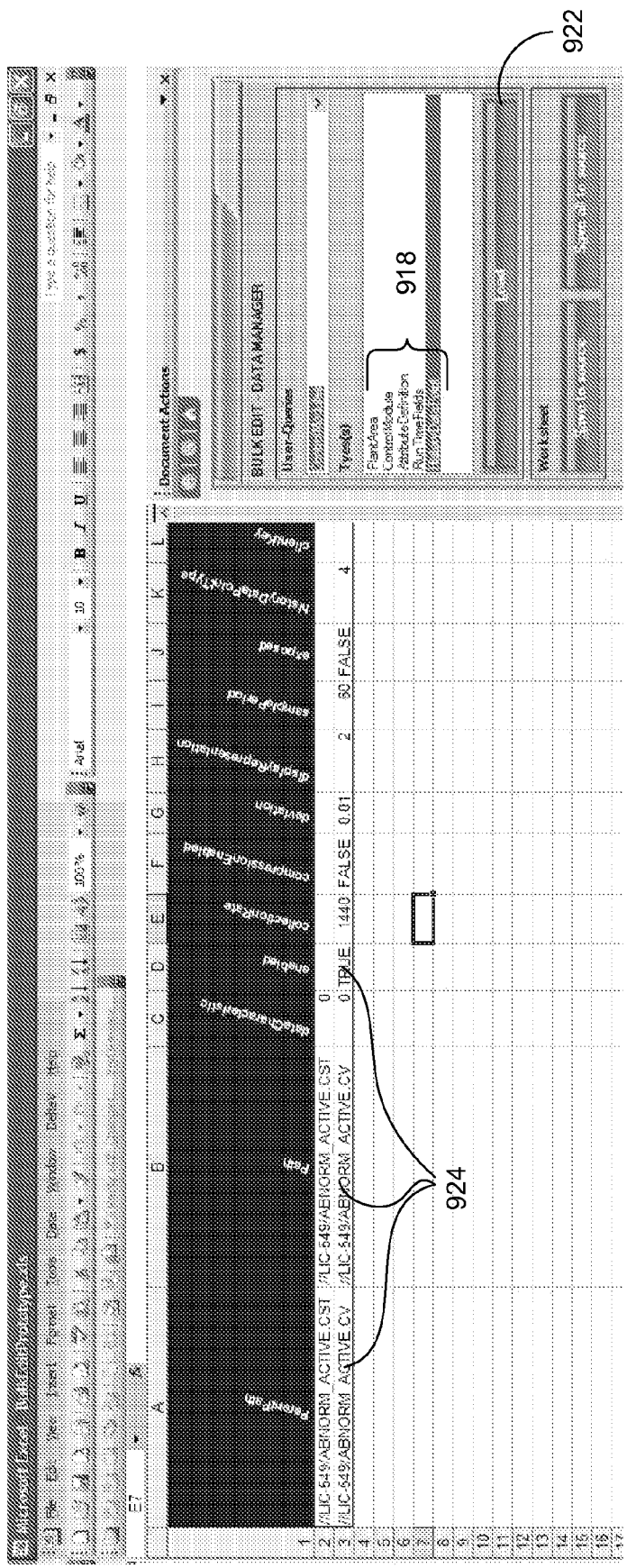
Figure 9D:
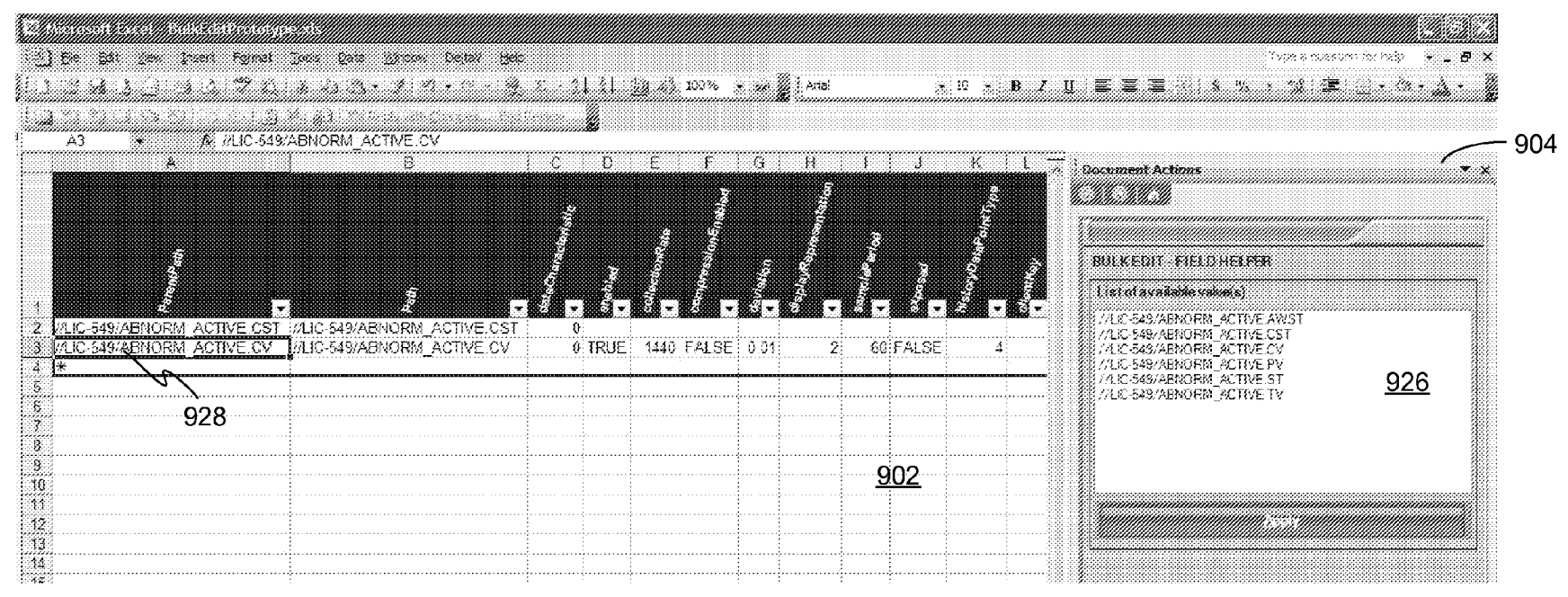

As shown in FIG. 9B, after selecting a type of control device in the user-queries drop down list control 910, available process control data types 918 corresponding to the selected type of control device are listed in a type(s) list box 920. As shown in FIG. 9C, after a user selects one of the process control data types 918 and selects a load button 922, process control data values 924 associated with the selected one of the process control data types 918 are imported into the spreadsheet document 902. FIG. 9D illustrates a field helper listbox 926 in the document actions tool panel 904. The field helper listbox 926 is used to display additional process control data associated with a selected process control data value in the spreadsheet document 902. For example, in FIG. 9D, the field helper listbox 926 includes a plurality of available process control data associated with a selected process control data value 928 in the spreadsheet document 902.

Figure 10A:
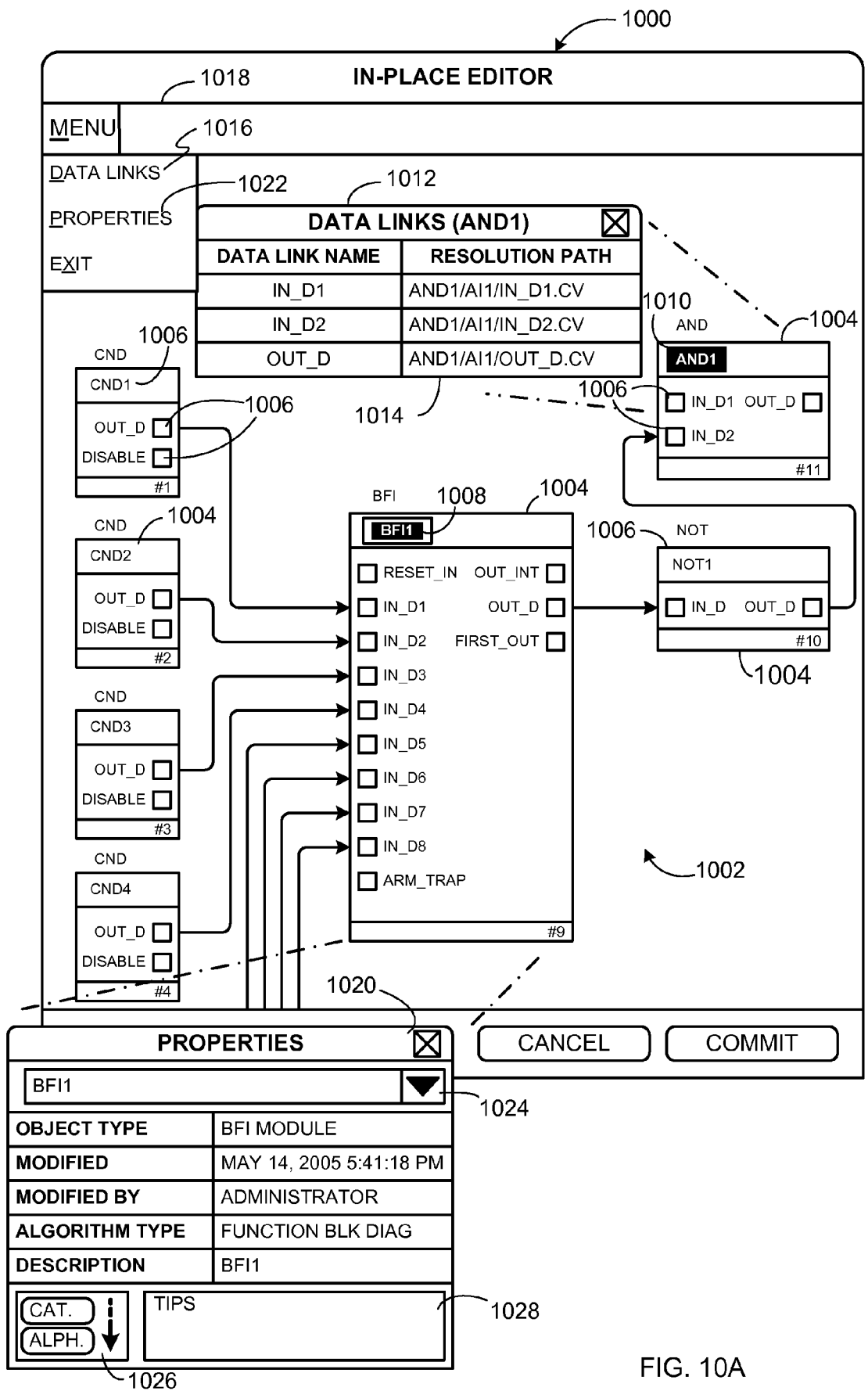
FIGS. 10A and 10B illustrate an example in-place editor interface display of the in-place editor of FIG. 2.
Figure 10B:
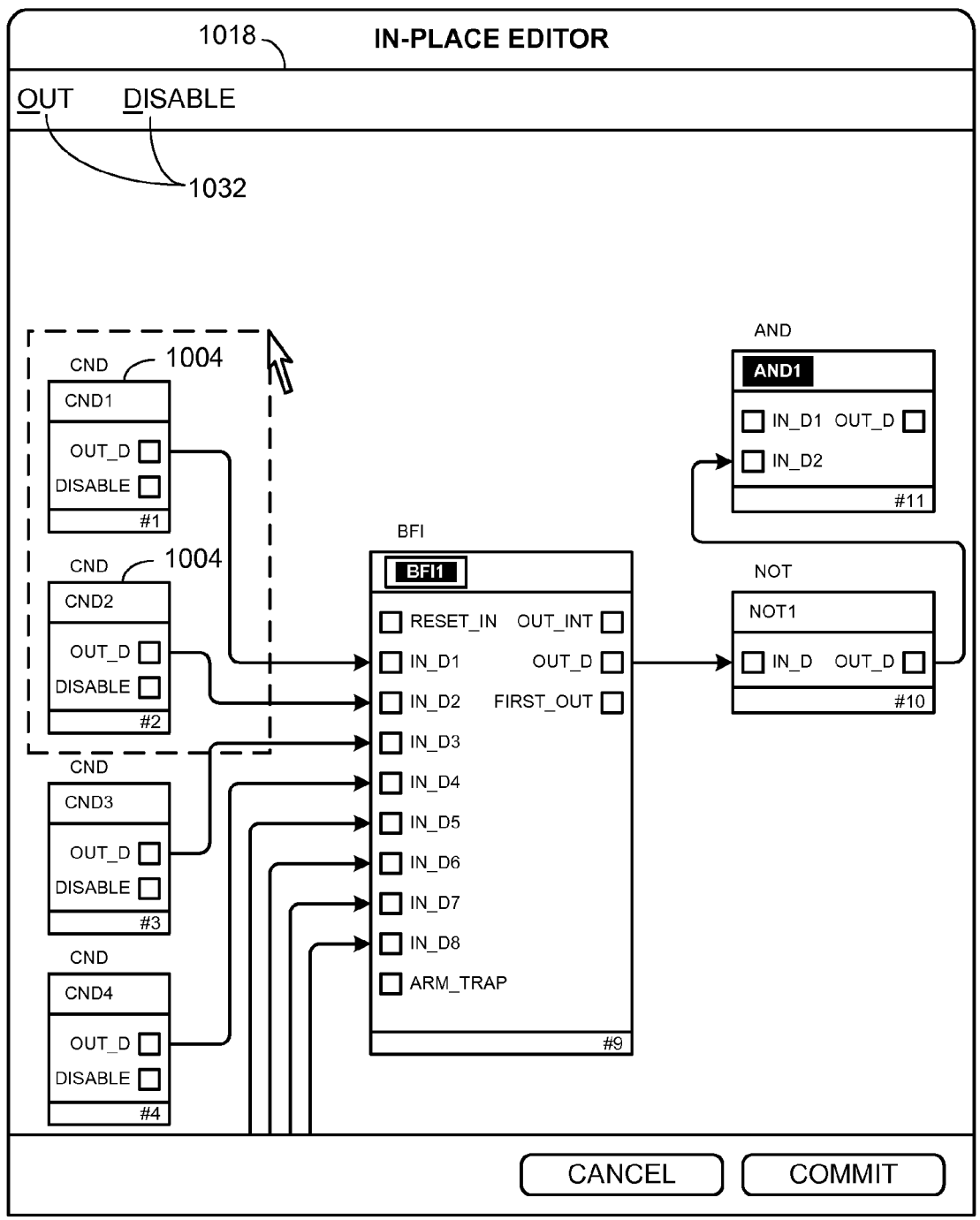

FIGS. 10A and 10B illustrate an example in-place editor interface display 1000 of the in-place editor 226 of FIG. 2. As shown in FIG. 10A, the in-place editor interface 1000 includes a process system diagram 1002 having a plurality of control device blocks 1004. Each of the control device blocks 1004 represents a control device in a process control system corresponding to the control system diagram 1002. Each of the control device blocks 1004 includes data fields 1006 used to view and modify process control data. Some of the data fields 1006 are represented using check boxes for enabling or disabling an I/O port and some of the data fields 1006 are represented using text fields for modifying the name or identification value of the control device blocks 1004.

The in-place editor interface 1000 may be configured to provide feedback such as graphical effects or displays associated with the modifiability of process control data. For example, a device name field 1008 of the control device block labeled 'BFI' is selected and shown as highlighted text, which indicates that the device name field is editable. In contrast, a device name field of the control device block labeled 'AND' is selected, but shown as non-editable not modifiable by showing a highlighted textbox 1010.

To view and modify data links associated with each of the control device blocks 1004, the in-place editor interface 1000 is provided with a data link form 1012. The data link form 1012 is configured to display data locations 1014 (i.e., resolution paths) from which the status associated with each of the data fields 1006 may be retrieved. The data link form 1012 may be displayed in response to a user selecting a data link menu item 1016 from a menu bar 1018. Further, the data link form 1012 is configurable to be a free-floating form or a docked form that is dockable to the in-place editor interface 1000.

To view and modify property values associated with each of the control device blocks 1004, the in-place editor interface 1000 is provided with a properties form 1020. The properties form 1020 is configured to display process control data associated with a selected one of the control device blocks 1004 in response to a user selecting one of the control device blocks 1004 and then selecting a properties menu item 1022. The properties form 1020 includes a drop down list 1024 that may be used to select one of the control device blocks 1004 from within the context of the properties form 1020. The properties form 1020 also includes sorting buttons 1026 that may be selected to categorically or alphabetically sort the process control data in the properties form 1020. To provide tips or help with each property of the selected one of the control device blocks 1004, the properties form 1020 includes a tips textbox 1028. The in-place editor 226 (FIG. 2) may display help or tip information in the tips textbox 1028 for each property or process control data that a user selects in the properties form 1020.

As shown in FIG. 10B, the menu bar 1018 is configured to change each time a user selects one or more of the control device blocks 1004. Specifically, the in-place editor 226 (FIG. 2) provides menu categories 1032 on the menu bar 1018 that are associated with the selected control device blocks 1004. For example, as shown in FIG. 10B, the menu categories 1032 include an 'OUT' category and a 'DISABLE' category, both of which are associated with the selected control device blocks 1004 labeled CND1 and CND2.

Figure 11A:
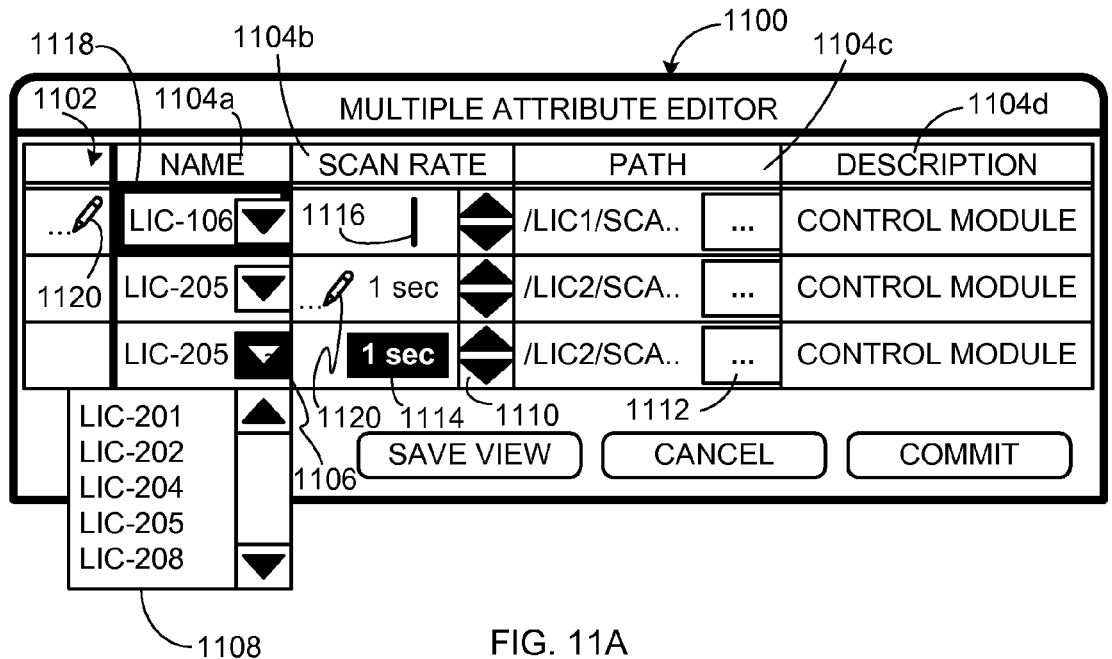
FIGS. 11A and 11B illustrate an example multiple attribute editor interface display for the in-place editor of FIG. 2.
Figure 11B:
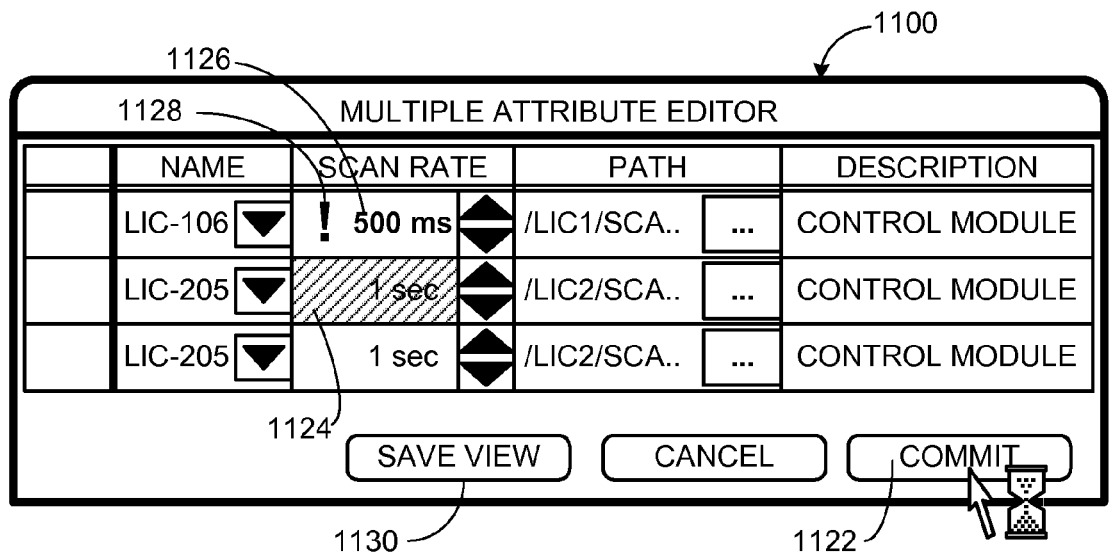

FIGS. 11A and 11B illustrate an example multiple attribute editor interface 1100 for the in-place editor 226 of FIG. 2. The multiple attribute editor interface 1100 may be used with the in-place editor interface 1000 of FIG. 10 to view and modify process control data associated with a process system diagram (e.g., the process system diagram 1002 of FIG. 10). More specifically, the multiple attribute editor interface 1100 may be used to view and modify process control data that is common to a plurality of control devices such as, for example, control devices represented by the control device blocks 1004 displayed in the in-place editor interface 1000. As shown in FIG. 11A, the multiple attribute editor interface 1100 includes a table or grid 1102 having a plurality of columns 1104*a-d*, each of which corresponds to a different process control data type. If a user selects a plurality of the control device blocks 1004 in the process system diagram 1002, the in-place editor 226 (FIG. 2) obtains the process control data types that are common to all the selected control device blocks and populates the plurality of columns 1104*a-d* with the retrieved process control data. The editor interface display 1100 may be implemented as a free-floating window associated with the in-place editor interface 1000 or as a docked tool panel within the in-place editor interface 1000.

The multiple attribute editor interface 1100 is provided with a plurality of user-interface controls to enable a user to modify the process control data. Each name cell of the name column 1104*a* includes a dropdown list control 1106. The dropdown list control 1106 may be used to display a names list 1108 from which a user can select available control devices. To modify the scan rate for the selected control devices, the scan rate column 1104*b* includes a spinner control 1110 in each of the scan rate cells. To change the path associated with the selected control devices, the path column 1104*c* includes an ellipses browse control 1112 in each of the path cells. Each of the data cells may also be modified by highlighting the text in the desired data cell and typing the modified value.

The multiple attribute editor interface 1100 is also configured to display a plurality of feedback graphical effects associated with modifying the control process data. For example, to indicate that a control process data value is editable or modifiable, a data cell may include highlighted text 1114 or a cursor 1116 when the data cell is selected. To indicate that the process control data in a data cell has been modified but not committed, persisted, or otherwise saved, the multiple attribute editor interface 1100 may change a data cell border characteristic by, for example, adding a border highlight 1118. Additionally or alternatively, the multiple attribute editor interface 1100 may show a pen icon 1120 adjacent to a modified process control data value. The multiple attribute editor interface 1100 may also be configured to indicate that process control data in a particular row has been modified by displaying the pen icon 1120 in a row header cell of the row containing the modified process control data.

To show error feedback, the multiple attribute editor interface 1100 is configured to display error feedback graphical effects. The in-place editor 226 (FIG. 2) may determine whether there are errors in the modified process control data by comparing each modified process control data value to one or more process control data rules. As shown in FIG. 11B, after a user selects a commit button 1122, the in-place editor 226 may check or verify all of the modified values in the grid 1102 or only modified data values that are selected or highlighted by a user. For example, if a user wants to commit only some of the modified values in the grid 1102, the user may select or highlight those modified values by selecting a plurality of individual data cells, an entire row, or an entire column. After the selected modified values are highlighted, the user may select the commit button 1122.

If any of the modified process control data values violates any of the rules, the multiple attribute editor interface 1100 may display error feedback graphical effects by modifying the text attributes or data cell attributes associated with the modified values that are in violation to indicate that the values are invalid. For example, as shown in FIG. 11B, to indicate an invalid value status, a save or commit error status, or an otherwise erroneous modified value status, the multiple attribute editor interface 1100 may change a background color 1124 of the data cell, use a bold font 1126 to display the invalid value, and/or display a punctuation mark 1128 or other symbol adjacent to the invalid or erroneous modified process control data value.

The multiple attribute editor interface 1100 may also display the error feedback graphical effects 1124, 1126, 1128, or any other suitable effect to indicate a detection that a modified process control data value has been modified substantially simultaneously by at least two users. For example, if a first user accesses a process control data value from a first computer terminal and a second user accesses the same process control data value from a second computer terminal and both users modify the process control data value substantially simultaneously, the multiple attribute editor interface 1100 may alert both users by displaying one of the error feedback graphical effects 1124, 1126, or 1128.

To save the process control data arrangement as displayed in the multiple attribute editor 1100, the multiple attribute editor 1100 is provided with a save view function that can be activated by selecting a save view button 1130. The save view function enables a user to select a particular data arrangement for displaying selected process control data and saving that data arrangement for subsequent use. In this manner, if there is process control data that a user accesses frequently, the user need not arrange the data for display each time the user accesses the process control data. Instead, the user can retrieve the pre-defined data arrangement from, for example, the control system database 214 (FIG. 2) and quickly view and modify process control data of interest.

FIGS. 12A-14C illustrate a plurality of display feedback effects associated with modifying and persisting, committing, or otherwise saving modified process control data values via a multiple attribute editor interface (e.g., the multiple attribute editor interface 1100 of FIGS. 11A and 11B). The in-place editor 226 (FIG. 2) may save modified process control data values based on any of a plurality of user interface interactions associated with the multiple attribute editor interface 1100. For example, a user may select the commit button 1122 (FIG. 11B) to save the modified data values. Alternatively, as described below, modified data may be saved in response to a user's pointer navigation through the multiple attribute editor interface 1100. Specifically, the multiple attribute editor interface 1100 may cause the in-place editor 226 to save or commit modified process control data in a section (e.g., a row, a column, etc.) of the multiple attribute editor interface 1100 each time a user changes focus from that section to another section.

Figure 12A:
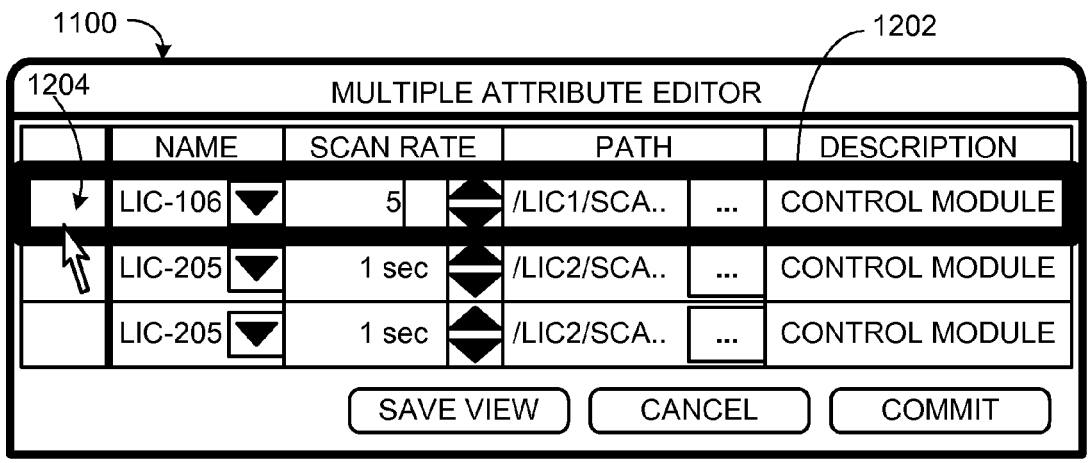
FIGS. 12A and 12B illustrate invalid data feedback graphics based on changing a row selection in the example multiple attribute editor interface display of FIGS. 11A and 11B.
Figure 12B:
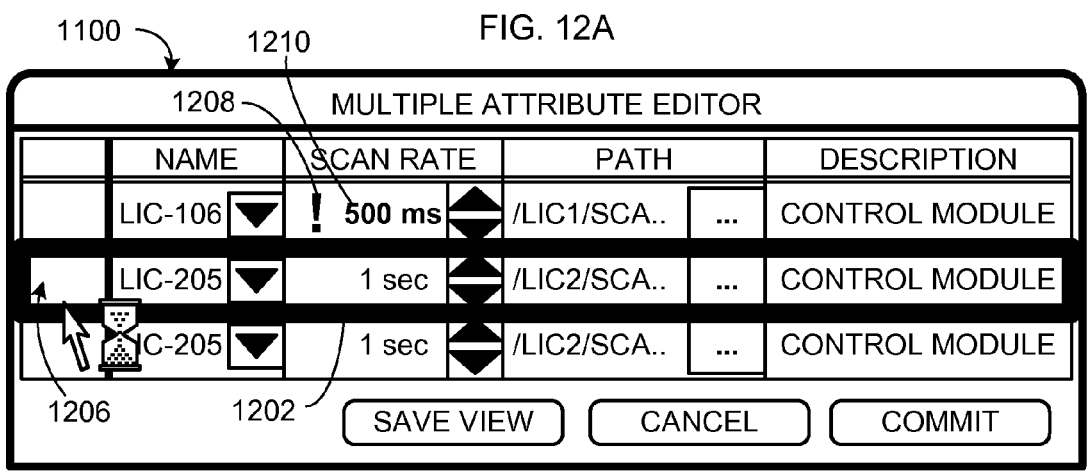

FIGS. 12A and 12B illustrate invalid data feedback based on changing a row selection in the example multiple attribute editor interface display 1100 of FIGS. 11A and 11B. As shown in FIG. 12A a focus effect 1202 is shown on a first row 1204 of the multiple attribute editor interface display 1100, indicating that the first row 1204 is currently selected. Changing the row selection from the first row 1204 to a second row 1206 as shown in FIG. 12B causes the focus effect 1202 to highlight or otherwise emphasize the second row 1206. Changing the row selection and the focus effect 1202 causes the in-place editor 226 (FIG. 2) to verify the modified values in the previously selected row (e.g., the first row 1204) by comparing all of the modified values in the previously selected row to one or more process control data rules associated with those modified values. Also, changing the row selection and the focus effect 1202 may cause the in-place editor 226 to commit or save the modified values if the modified values are acceptable based on the one or more process control data rules. In this case, after comparing the modified values to the one or more rules, the in-place editor 226 communicates the acceptable modified values to the client model 210 (FIG. 2) and causes the client model 210 to store the modified values in the control system database 214 (FIG. 2).

If the in-place editor 226 determines that any of the modified values are not acceptable based on the rules, the multiple attribute editor interface display 1100 shows graphical feedback effects to highlight or otherwise emphasize the erroneous, invalid, or otherwise unacceptable modified values. For example, in FIG. 12B an exclamation mark 1208 is displayed adjacent a 500 ms modified scan rate value 1210 and the font of the modified value 1210 is bolded.

Figure 13A:
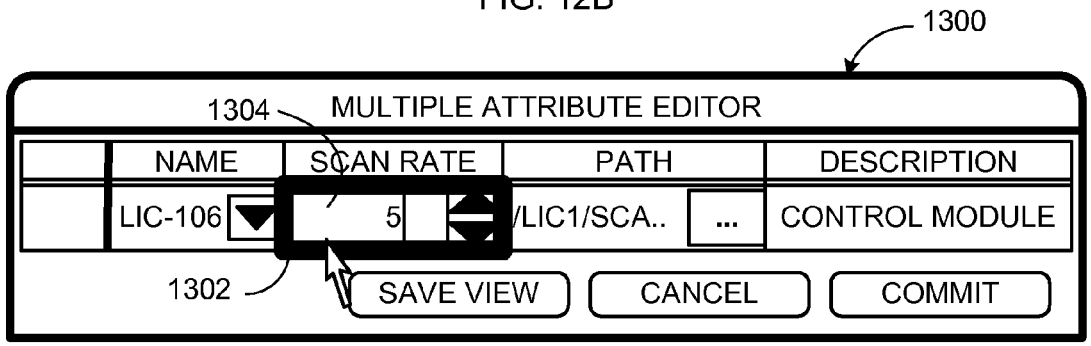
FIGS. 13A and 13B illustrate invalid data feedback graphics based on changing data cell selection in another example multiple attribute editor interface display.
Figure 13B:
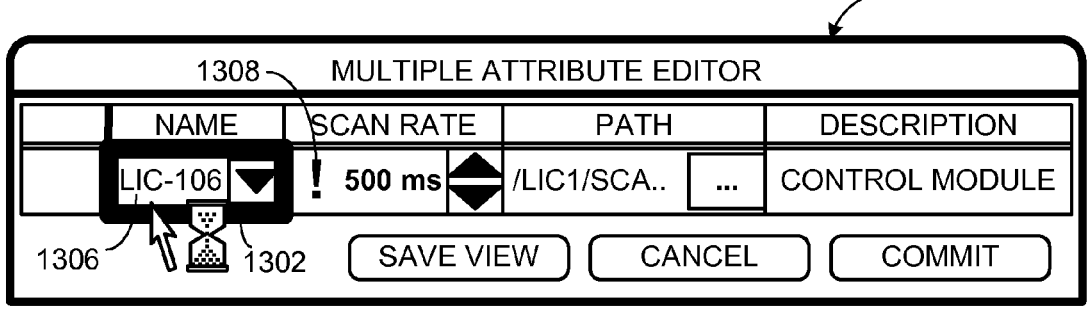

FIGS. 13A and 13B illustrate invalid data feedback based on changing data cell selection in another example multiple attribute editor interface display 1300. As shown in FIG. 13A, a focus effect 1302 is shown on a scan rate data cell 1304 indicating that the data cell 1304 is currently selected. Changing the data cell selection from the scan rate data cell 1304 to a name data cell 1306 as shown in FIG. 13B causes the focus effect 1302 to show on the name data cell 1306. Changing the data cell selection and the focus effect 1302 causes the in-place editor 226 (FIG. 2) to verify the modified value in the previously selected data cell (e.g., the scan rate data cell 1304) by comparing the modified value in the previously selected data cell to one or more process control data rules corresponding to the modified value. If the modified value is acceptable or valid, the in-place editor 226 communicates the acceptable modified value to the client model 210 (FIG. 2) and causes the client model 210 to store the modified values in the control system database 214 (FIG. 2). If the in-place editor 226 determines that the modified value in the scan rate data cell 1304 is invalid or unacceptable, the multiple attribute editor interface 1300 may display an exclamation mark 1308 or any other symbol adjacent to the invalid modified value and/or bold the text of the modified value.

Figure 14A:
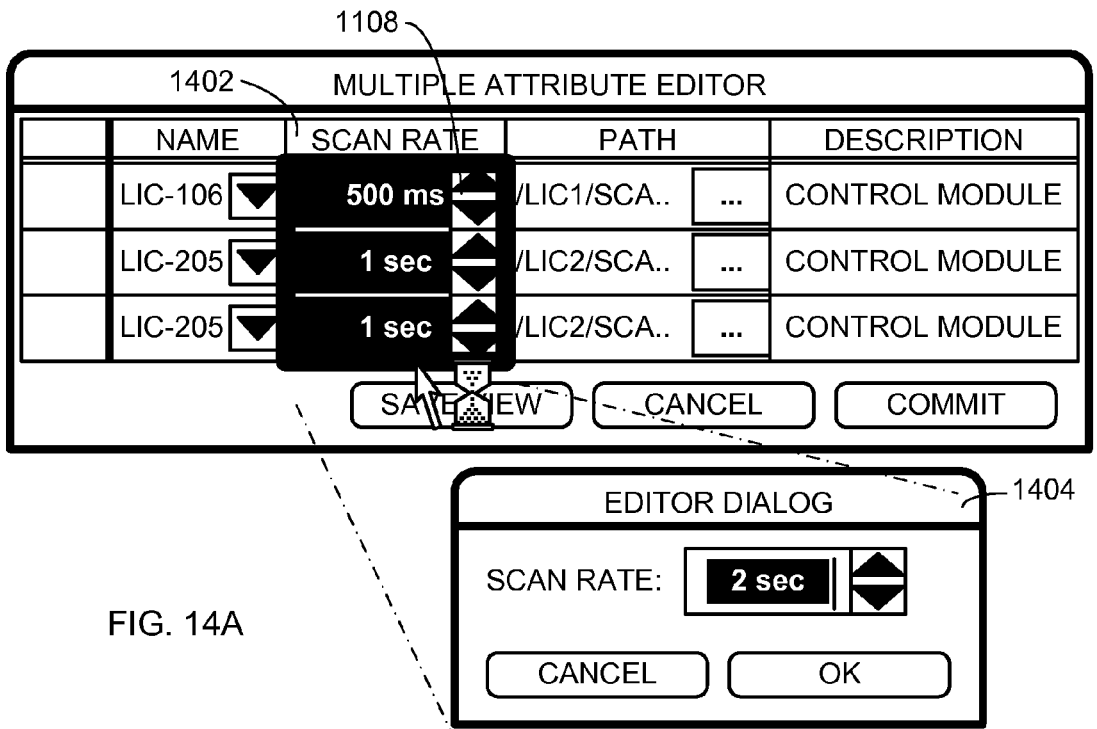
FIGS. 14A-14C illustrate invalid data feedback graphics based on simultaneously modifying a process control data and changing a row selection in the example multiple attribute editor interface display of FIGS. 11A and 11B.
Figure 14B:
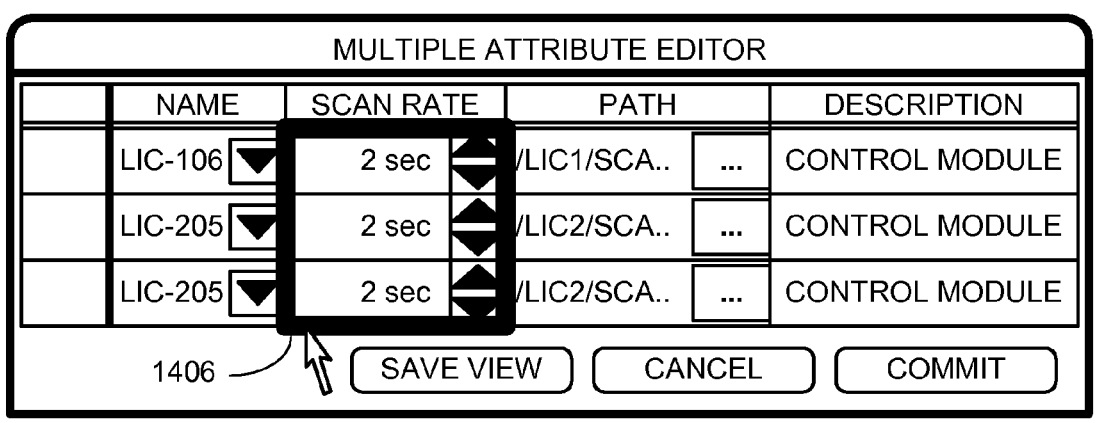
Figure 14C:
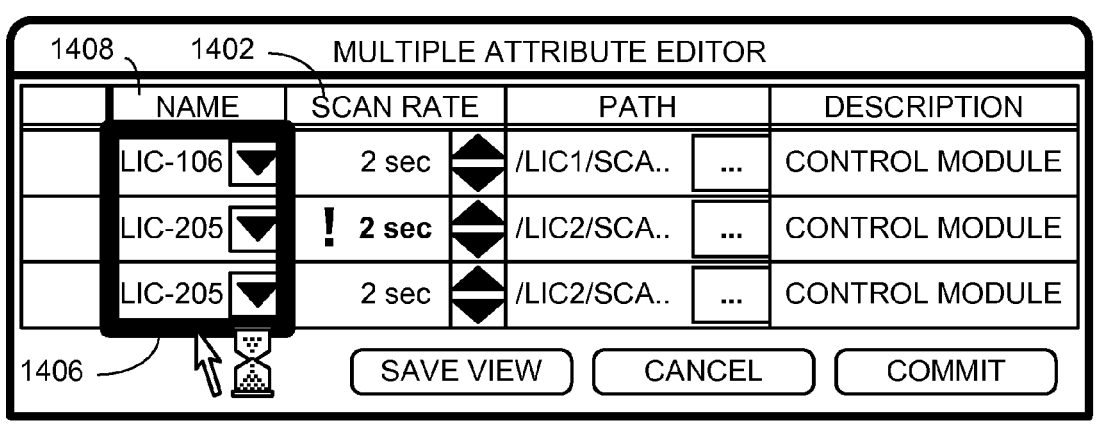

FIGS. 14A-14C illustrate invalid data feedback based on simultaneously modifying a plurality of process control data and changing a row selection in the example multiple attribute editor interface display 1100 of FIGS. 11A and 11B. As shown in FIG. 14A, the multiple attribute editor interface 1100 may be used to select and modify a plurality of process control data values or attribute values that are common to a plurality of control devices. A plurality of scan rate values selected in a scan rate column 1402 can be modified by using the spinner controls 1108, by typing over the selected values, or via a dialog display 1404. For example, the multiple attribute editor interface display 1100 may be configured to show the dialog display 1404 any time two or more process control data values are selected. The values of all the selected process control data values can be modified simultaneously via the dialog display 1404. Selecting an OK button 1406 hides the dialog display 1404 and populates the data cells in the scan rate column 1402 with the modified value provided via the dialog display 1404 as shown in FIG. 14B.

The modified values in the scan rate column 1402 may be persisted, stored, or otherwise saved based on changing a column selection from the scan rate column 1402 to another column. For example, after hiding the dialog display 1404 and populating the scan rate column 1402 a focus effect 1406 is shown on the selected scan rate column 1402. Changing the column selection from the scan rate column 1402 to a name column 1408 as shown in FIG. 14C causes the focus effect 1406 to show on the name column 1408. Changing the column selection and the focus effect 1406 causes the in-place editor 226 (FIG. 2) to verify the modified values in the previously selected column (e.g., the scan rate column 1402) by comparing the modified values to one or more process control data rules corresponding to the modified value in the previously selected column. If one or more of the modified values are acceptable or valid, the in-place editor 226 communicates the acceptable modified values to the client model 210 (FIG. 2) and causes the client model 210 to store the modified values in the control system database 214 (FIG. 2). If the in-place editor 226 determines that one or more of the modified values are invalid or unacceptable, the multiple attribute editor interface 1100 displays a graphical indicator to accentuate or emphasize the one or more invalid modified values.

Figure 15:
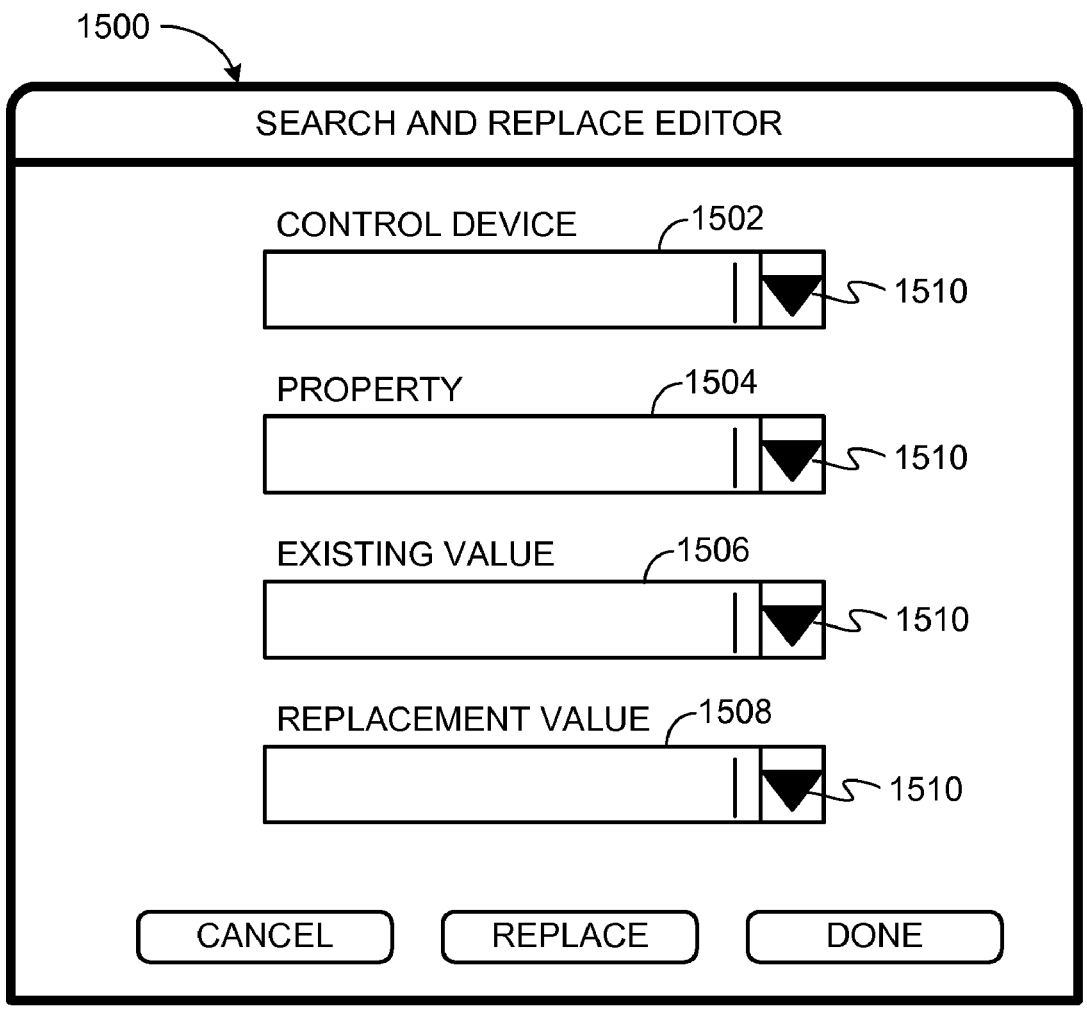
FIG. 15 is an example search and replace editor interface that may be used to modify process control data stored in a database.

FIG. 15 is an example search and replace editor interface 1500 that may be used to modify process control data stored in the control system database 214 (FIG. 2). The search and replace editor interface 1500 is used by a user to provide search and replace information regarding process control data stored in the control system database 214. The search and replace editor interface 1500 communicates the search and replace information to the search and replace editor 228 described above in connection with FIG. 2 to search and replace process control data as specified by a user. As shown in FIG. 15, the search and replace information may be provided via a control device(s) data field 1502, a property data field 1504, an existing value data field 1506, and a replacement value data field 1508. Each of the data fields 1502, 1504, 1506, and 1508 includes a drop down list control 1510 that can be used to display a list (not shown) of selections for each data field. The search and replace editor 228 may populate the lists for the control device(s) data field 1502, the property data field 1504, and the existing value data field 1506 by retrieving all possible values for each of the data fields 1502, 1504, and 1506 from the control system database 214. For example, the search and replace editor 228 may send a data request to the client model 210 and the query builder 216 may generate one or more of the queries 218 to retrieve the requested process control data from the control system database 214.

One or more control devices (e.g., the control device blocks 1004 of FIG. 10A) may be selected simultaneously via the control device(s) data field 1502. In this manner, a user may simultaneously replace all the values for process control data that are common to a plurality of selected control devices. A user may select via the property data field 1504 the property or attribute of the one or more selected control devices for which the user wants to replace existing values. If there are specific existing values that the user wants to replace for the selected property or attribute, the user can provide the specific existing value in the existing value data field 1506. The user specifies via the replacement value data field 1508 the value with which the specified existing values or all the values for the selected property are to be replaced.

FIGS. 16 through 24 illustrate flowcharts representative of example machine readable and executable instructions for implementing the example process control system data manager 102, the example external editing system 104, and the example data conversion system 106 of FIG. 1. In these examples, the machine readable instructions comprise a program for execution by a processor such as the processor 2512 shown in the example processor system 2510 of FIG. 25. The program may be embodied in software stored on a tangible medium such as a CD-ROM, a floppy disk, a hard drive, a digital versatile disk (DVD), or a memory associated with the processor 2512 and/or embodied in firmware or dedicated hardware in a well-known manner. For example, any or all of structures within the example process control system data manager 102, the example external editing system 104, and the example data conversion system 106 could be implemented by software, hardware, and/or firmware. Further, although the example program is described with reference to the flowcharts illustrated in FIGS. 16-24, persons of ordinary skill in the art will readily appreciate that many other methods of implementing the example process control system data manager 102, the example external editing system 104, and the example data conversion system 106 may alternatively be used. For example the order of execution of the blocks may be changed, and/or some of the blocks described may be changed, eliminated, or combined. Furthermore, the data manager 102 has full access to all of the relationships between the control system, the process, the material flows and compositions, equipment, devices, and the operational displays.

Figure 16:
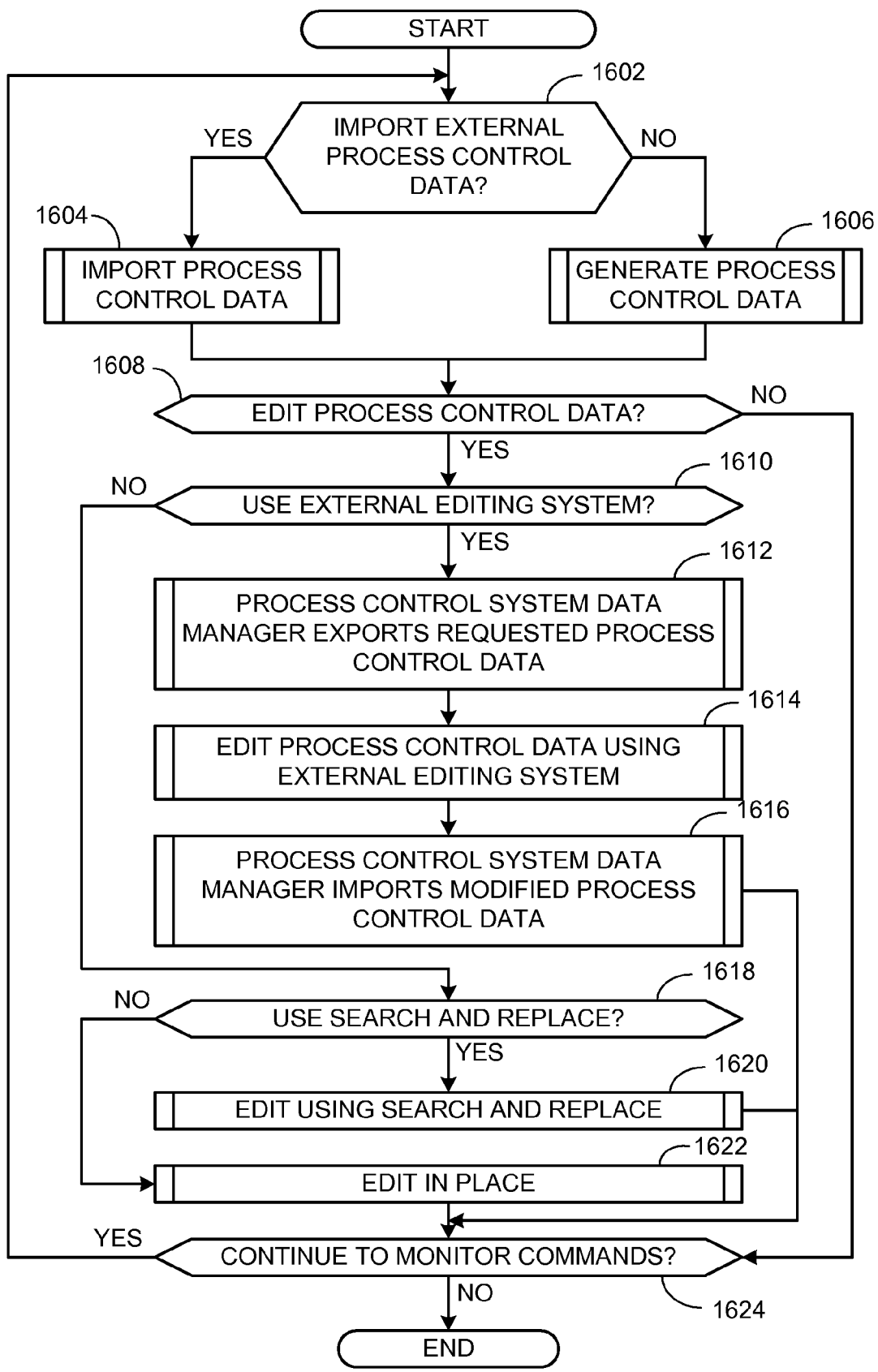
FIG. 16 is a flowchart illustrating an example method that may be used to implement the example systems of FIGS. 1 through 4.

Now turning in detail to the flowchart of FIG. 16, during operation the process control system data manager 102 determines whether it should import external process control data (block 1602). For example, if the data import/export interface 202 (FIG. 2) generates an import command or instruction, the process control system data manager 102 may determine at block 1602 that it needs to import external process control data. The data import/export interface 202 may assert an import command in response to user input provided via the user interface 206 (FIG. 2). Alternatively, the in-place editor 226 (FIG. 2) may generate a new data command or instruction indicating that a user is generating new process control data via, for example, the example in-place editor interface 1000 (FIG. 10A). For example, a user may generate new process control data by drawing and connecting control device blocks (e.g., the control device blocks 1004) to form a system diagram (e.g., the process system diagram 1002 of FIG. 10A) in the in-place editor interface 1000 and specifying process control data to define the functionality of each control device block.

If the process control system data manager 102 determines at block 1602 that it needs to import external process control data, the process control system data manager 102 imports the external process control data (block 1604) as described below in connection with the flowchart of FIG. 17. The external process control data may be custom data or legacy process control data as described above in connection with the data conversion system 106 of FIGS. 1 and 4. If the process control system data manager 102 determines at block 1602 that process control data is not to be imported, then the process control system data manager 102 may instead generate new process control data (block 1606) as described below in connection with FIG. 18.

The process control system data manager 102 then determines whether it has received a request to modify or edit process control data (block 1608). A request to edit process control data may be provided by the data import/export interface 202 in response to user input provided via the user interface 206. For example, a user may select to export selected process control data for viewing or modifying, which the process control system data manager 102 interprets as a request to modify or edit the selected process control data. Alternatively, a request to edit process control data may be provided by the in-place editor 226 (FIG. 2) in response to user input provided via the in-place editor interface 1000 of FIG. 10A. For example, if a user opens a system diagram (e.g., the process system diagram 1002 of FIG. 10A) and/or selects process control data fields (e.g., the device name field 1008 of FIG. 10A), the in-place editor 226 generates a request to access for editing the process control data corresponding to the system diagram or the selected process control data fields.

If the process control system data manager 102 determines at block 1608 that it has received a request to modify or edit process control data, the process control system data manager 102 determines whether the request to modify or edit specifies using the external editing system 104 (FIG. 1) (block 1610). If the request specifies using the external editing system 104, the process control system data manager 102 exports the requested process control data (block 1612) as described below in connection with FIG. 19. A user may then edit the process control data using the external editing system 104 (block 1614) as described below in connection with FIG. 20. The process control system data manager 102 then imports the modified process control data (block 1616) as described below in connection with FIG. 21.

If at block 1610 the process control system data manager 102 determines that the edit request received at block 1608 does not specify using the external editing system 104, the process control system data manager 102 determines whether the edit request specifies using a search and replace editor (e.g., the search and replace editor interface 1500 of FIG. 15) (block 1618). If the edit request specifies a search and replace editor, then the process control data is edited using the search and replace editor engine 228 (FIG. 2) (block 1620) as described below in connection with FIG. 22. Otherwise, the process control data is edited in place (block 1622) using the in-place editor 226 as described below in connection with FIG. 23.

After the process control system data manager 102 imports the modified process control data at block 1616 or after the process control data is edited or modified at block 1620 or block 1622 or if the process control system data manager 102 determines at block 1608 that it has not received a request to edit process control data, the process control system data manager 102 determines whether it should continue to monitor commands or instructions (block 1624). If the process control system data manager 102 continues to monitor commands or instructions, control is passed back to block 1602. Otherwise, the process ends.

Figure 17:
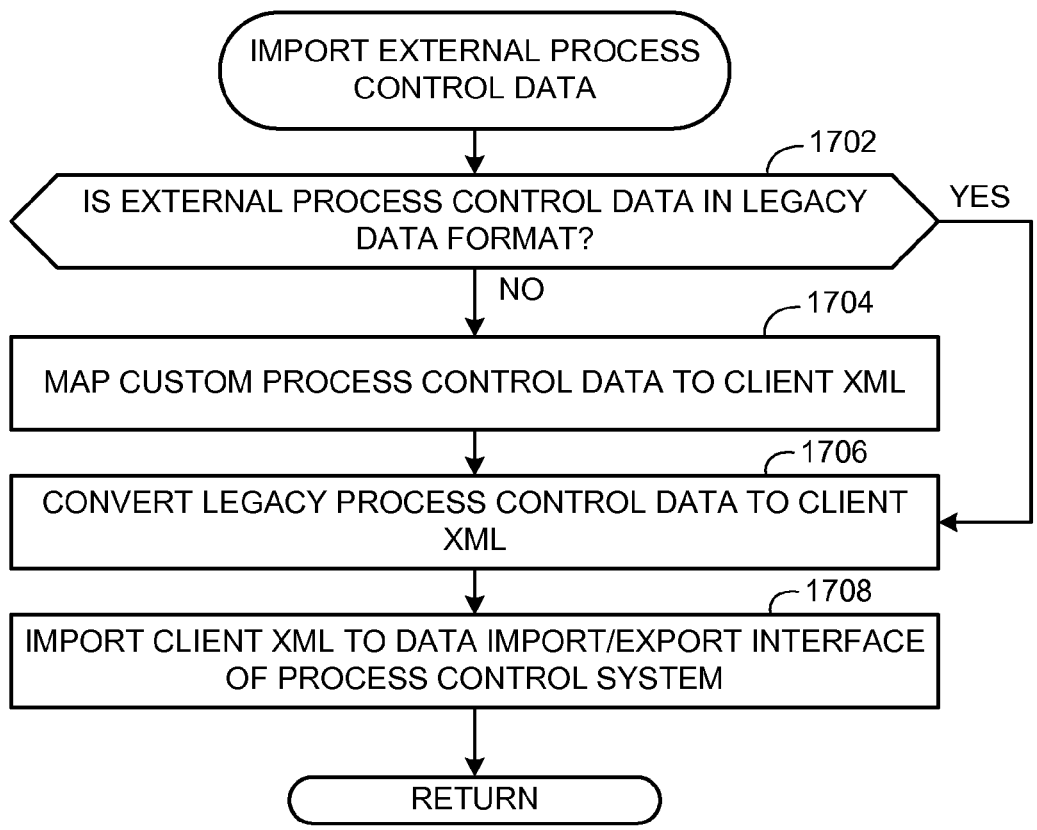
FIG. 17 is a flowchart illustrating an example method that may be used to import external process control data using the data conversion system and the process control system data manager of FIG. 1.

FIG. 17 is a flowchart illustrating an example method to import external process control data using the data conversion system 106 and the process control system data manager 102 of FIG. 1. The example method depicted in the flowchart of FIG. 17 may be used to implement the operation of block 1604 of FIG. 16 by converting external process control data such as custom data or legacy data to the client XML 108 (FIGS. 1-4) via the data conversion system 106 and importing the client XML 108 into the process control system data manager 102.

Initially, the data conversion system 106 determines if the external process control data is in a legacy data format (block 1702). If the external process control data is not in a legacy data format, the external process control data is in a custom data format. In this case, the data conversion system 106 maps the custom process control data to a client XML format (block 1704). For example, the data conversion system 106 may receive the custom process control data 404 (FIG. 4) and map the custom process control data via the custom mapper 402 (FIG. 4) to the client XML 108. If the external process control data is in legacy data format, the data conversion system 106 converts the legacy data format to the client XML 108 (block 1706). The client XML 108 may be exported at block 1704 or at block 1706 to a user-designated storage location such as, for example, a network drive, a local drive, etc.

After the client XML 108 is exported by the data conversion system 106, the process control system data manager 102 imports the client XML 108 (block 1708). For example, the data import/export interface 202 (FIG. 2) of the process control system data manager 102 can retrieve the client XML 108 from the designated storage location and communicate the client XML 108 to the client model 210. The client model 210 (FIG. 2) can then build a query (e.g., one of the queries 218) via the query builder 216 (FIG. 2) to store the process control data from the client XML 108 to the control system database 214 (FIG. 2). The process then returns control to, for example, the operation of block 1608 of FIG. 16.

Figure 18:
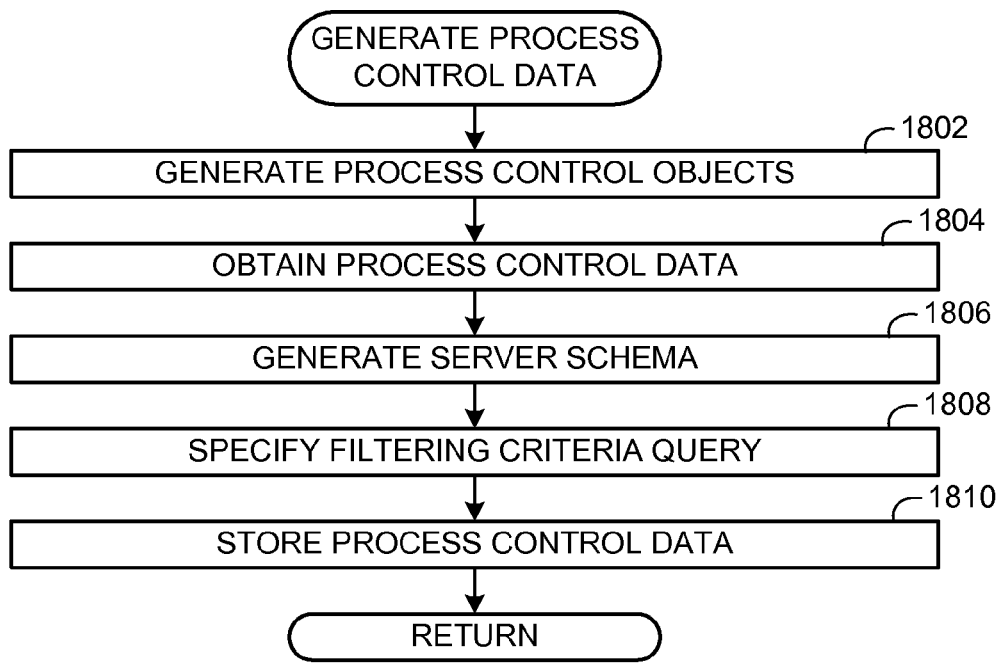
FIG. 18 is a flowchart of an example method that may be used to generate process control data using the example process control system data manager of FIG. 1.

FIG. 18 is a flowchart of an example method that may be used to generate process control data using the example process control system data manager 102 of FIG. 1. The example method of FIG. 18 may be used to implement the operation of block 1606 of FIG. 16 to generate new process control data. The process control data may be generated in response to user input obtained via the in-place editor 226 (FIG. 2). Initially, the process control system data manager 102 generates process control software objects (block 1802) associated with control devices in a process system. For example, a user may create one or more control device blocks 1004 (FIG. 10A) via the in-place editor interface 1000 (FIG. 10A) to create the control system diagram 1002 (FIG. 10A). For each of the control device blocks 1004, the process control system data manager 102 generates a process control software object. The process control system data manager 102 uses the process control software objects to manage the process control data associated with each of the control device blocks 1004.

The process control system data manager 102 then obtains process control data for each of the process control software objects (block 1804). For example, after a user creates one of the control device blocks 1004, the user may create process control data values for that control device block 1004. The newly created process control data is then communicated from the in-place editor 226 to the client model 210 to be stored in the control system database 214. The client model 210 then generates a server schema for the new process control data (block 1806) and one or more filtering criteria queries (block 1808). The filtering criteria queries specify what new process control data is being generated. For example, a user may create one of the control device blocks 1004 and only generate process control data for a portion of the control device block 1004. In this case, the filtering criteria query specifies the portions of the control device block 1004 for which the user generated process control data.

The control system database server 212 (FIG. 2) then obtains the process control data from the client model 210 and stores the process control data in the control system database 214 (block 1810). For example, the client model 210 may communicate the server schema, the filtering criteria query generated at block 1808, and the process control data to the control system database server 212. The control system database server 212 may store the process control data in the control system database 214 based on the server schema and the query. The process then returns control to, for example, the operation of block 1608 (FIG. 16).

Figure 19:
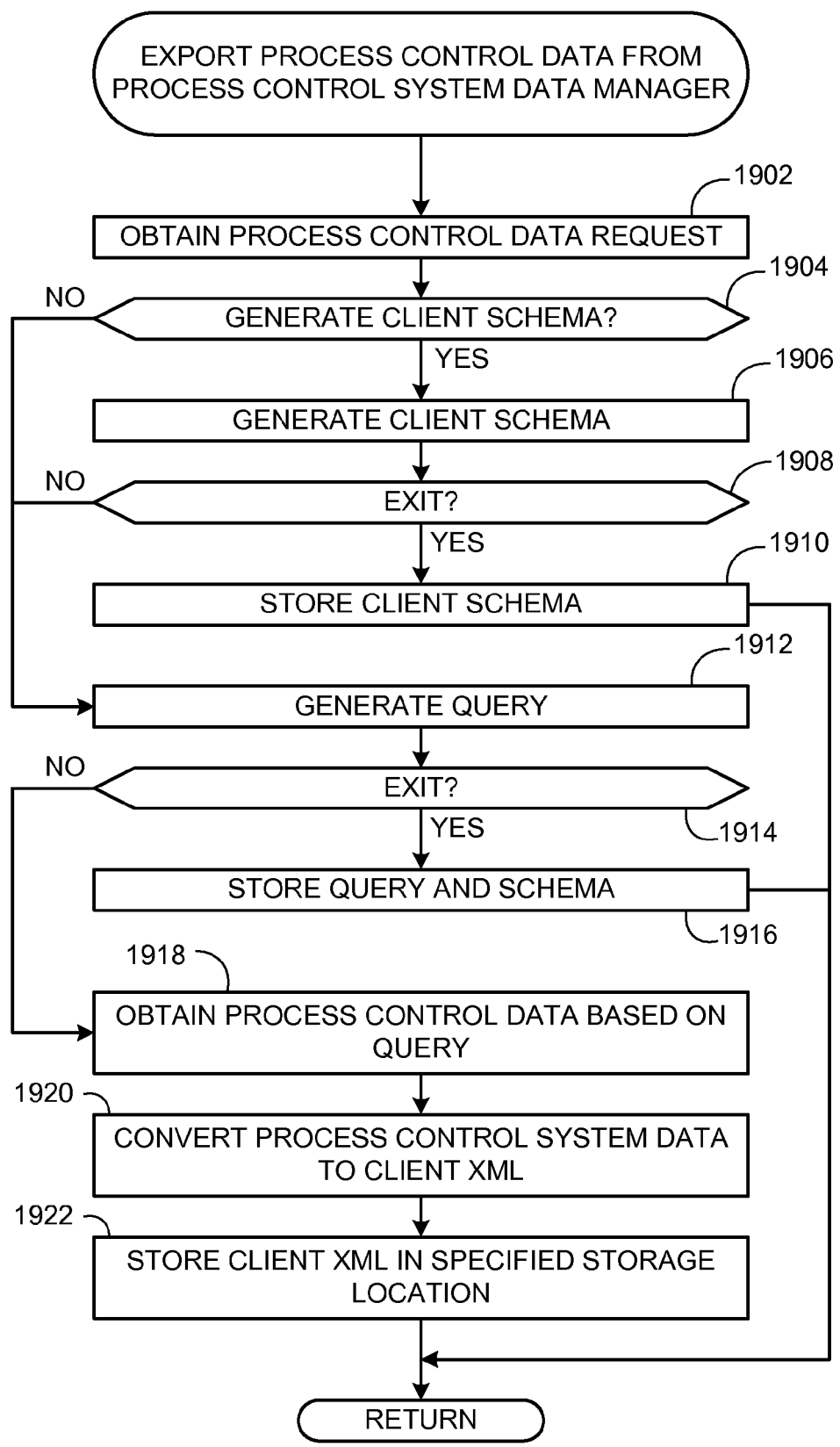
FIG. 19 is a flowchart of an example method that may be used to export process control data from the example process control system data manager of FIG. 1.

FIG. 19 is a flowchart of an example method that may be used to export process control data from the example process control system data manager 102 of FIG. 1. The example method of FIG. 19 may be used to implement the operation of block 1612 of FIG. 16. Initially, the data import/export interface 202 obtains a process control data request (block 1902). For example, the process control data request may be provided by a user via the user interface 206. The process control system data manager 102 then determines whether to generate a client schema for the requested process control data (block 1904). For example, a user may specify the generation of a client schema for the requested process control data. Alternatively, the client model 210 may generate one of the queries 218 to cause the control system database server 212 to verify whether a client schema for the requested data is stored in the control system database 214.

If a user specifies via the user interface 206 that a client schema should be generated or if the client model 210 determines that a client schema does not already exist (e.g., is not stored in the control system database 214), the process control system data manager 102 generates the client schema (block 1906). For example, the client model 210 may generate a client schema for the requested process control data based on user-input that specifies the client schema. Alternatively, the client model 210 may generate the client schema from a pre-defined schema template. The process control system data manager 102 then determines whether to exit the export process (block 1908). For example, if after creating a client schema a user desires to finish the export process at a later time, the user may indicate via the user interface 206 to finish the export later. In this case, the control system database server 212 stores the client schema in the control system database 214 (block 1910). In this manner, the user may subsequently retrieve the client schema at any time that the user chooses to continue the export process.

If the user chooses to continue with the export process, the process control system data manager 102 determines at block 1908 that it should not exit. In this case, the client model 210 generates a query (e.g., one of the queries 218 of FIG. 2) (block 1912) to retrieve from the control system database 214 the requested process control data. For example, a user may specify via the user interface 206 one or more filtering conditions to export selected process control data. The client model 210 may then generate a query based on the user-selected filtering conditions. After generating the query, the process control system data manager 102 determines whether to exit the export process (block 1914). If the user indicates via the user interface 206 to finish the export process at a later time, the control system database server 212 stores the query generated at block 1912 and the client schema generated at block 1906 in the control system database 214 (block 1916).

If the process control system data manager 102 determines at block 1914 not to exit the export process, the control system database server 212 obtains the requested process control data based on the query generated at block 1912 (block 1918). The client model 210 then converts the requested process control data to the client XML 108 (block 1920). More specifically, the control system database server 212 communicates the requested process control data to the client model 210 as the server XML 224 (FIG. 2) and the client model 210 converts the process control data from the server XML 224 to the client XML 108 based on the client schema generated at block 1906. The data import/export interface 202 then exports the client XML 108 by storing the client XML 108 in a storage location specified by the user (block 1922). For example, the client model 210 may communicate the client XML 108 to the data import/export interface 202 and the data storage interface 208 may store the client XML 108 in, for example, a network drive, a laptop drive, a removable storage medium, or any other storage location as specified by the user. After storing the client XML 108 or after either of the operation of blocks 1910 and 1916 if the user chooses to finish the export process later, the process then returns control to, for example, the operation of block 1614 (FIG. 16).

Figure 20:
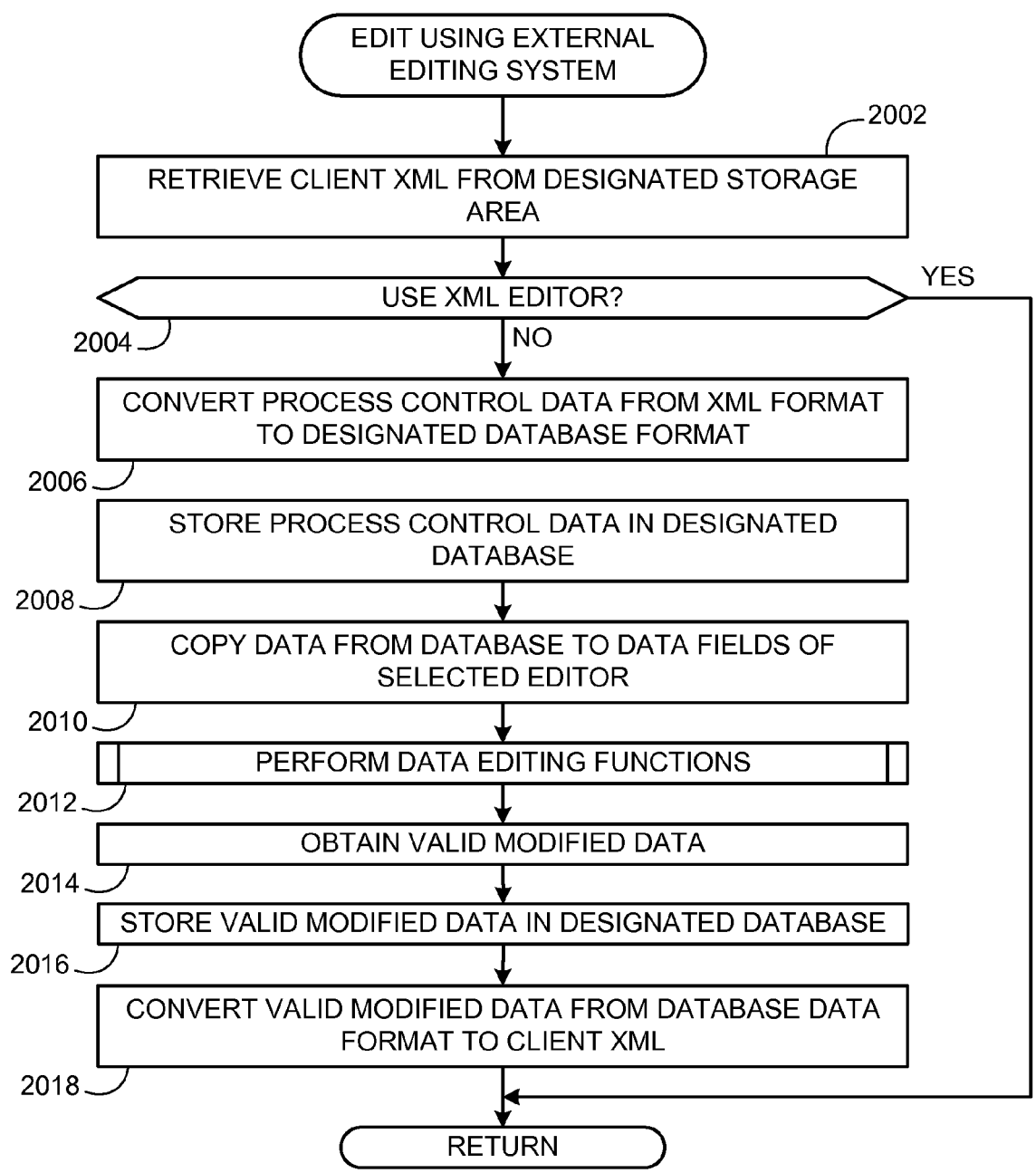
FIG. 20 is a flowchart of an example method that may be used to edit process control data using the example external editing system of FIG. 1.

FIG. 20 is a flowchart of an example method that may be used to edit process control data using the example external editing system 104 of FIG. 1. The example method described in connection with FIG. 20 may be used to implement the operation of block 1614 (FIG. 16). Initially, the data converter/migration tool 302 (FIG. 3) retrieves the client XML 108 from a designated storage area (block 2002). For example, a user may specify via one of the external editors 316, 318, and 320 (FIG. 3) a storage location from where the data converter/migration tool 302 should retrieve the client XML 108.

After the data converter/migration tool 302 retrieves the client XML 108, the data converter/migration tool 302 determines whether a user will edit the process control data using the XML editor 316 (FIG. 3) (block 2004). For example, if a user opens the XML editor 316, the XML editor 316 sends an XML editor code to the data converter/migration tool 302 indicating that the user has selected the XML editor 316 to modify the process control data. If the data converter/migration tool 302 determines that the user will use the XML editor 316, then the data converter/migration tool 302 does nothing with the client XML 108 because the XML editor 108 can open the client XML 108 and access and modify the process control data directly in the XML format. However, if the data converter/migration tool 302 determines the user will not use the XML editor 316 to modify the process control data, the data converter/migration tool 302 converts the process control data from the XML format to a designated database format (block 2006). For example, as described above in connection with FIG. 3, the external editing system 104 may include or be communicatively coupled to one or more types of databases or data stores (e.g., the SQL database 304, the Oracle® database 306, or other data store(s) 308). The data converter/migration tool 302 may convert the process control data to a data format associated with the database or data store in which the process control data will be stored. The data converter/migration tool 302 then stores the converted process control data in the designated one of the databases or data stores (block 2008).

The common data source interface 322 and the datasource (e.g., one of the SQL datasource 324, the Oracle® datasource 326, or the other datasource 328 of FIG. 3) of the designated database or data store work cooperatively to copy the process control data from the designated database or datasource to data fields (e.g., the data fields 606 of FIG. 6 or 706 of FIG. 7) of one of the external editors 320 or 318 (FIG. 3) (block 2010). For example, after opening a word processor document (e.g., the word processor document 602 of FIG. 6) or a spreadsheet document (e.g., the spreadsheet document 702 of FIG. 7), the data fields 606 or 706 assert data requests to the common data source interface 322 to obtain process control data. The common data source interface 322 may communicate commands to a designated datasource to retrieve the requested process control data from a designated database or data store.

The selected one of the external editors 320 or 318 then performs data editing functions (block 2012) while the user modifies the process control data. The data editing functions may include, for example, rule checking, providing graphical feedback to a user, etc. An example method used to implement the data editing functions is described below in connection with FIG. 24.

The common data source interface 322 and one of the datasources 324, 326, and 328 then obtain valid modified process control data (block 2014) and store the valid modified process control data in a designated database (block 2016). For example, if the modified process control data conforms with process control data rules, the modified process control data is deemed valid and is allowed to be stored in the designated database. On the other hand, invalid process control data is not stored in the designated database and must be changed to valid data prior to storage. The valid modified values may also be converted to XML format and stored in the client XML 108 (block 2018) to keep the client XML 108 up to date each time data is modified. By keeping the client XML 108 up to date or current, a user may import the client XML 108 into the process control system data manager 102 without having to first convert all the process control data from the data format of the designated database to the client XML 108. After storing the valid modified values in the client XML 108 or if the data converter/migration tool 302 determines at block 2004 that the XML editor 316 will be used to modify the process control data, the process then returns control to, for example, the operation of block 1616 (FIG. 16).

Figure 21:
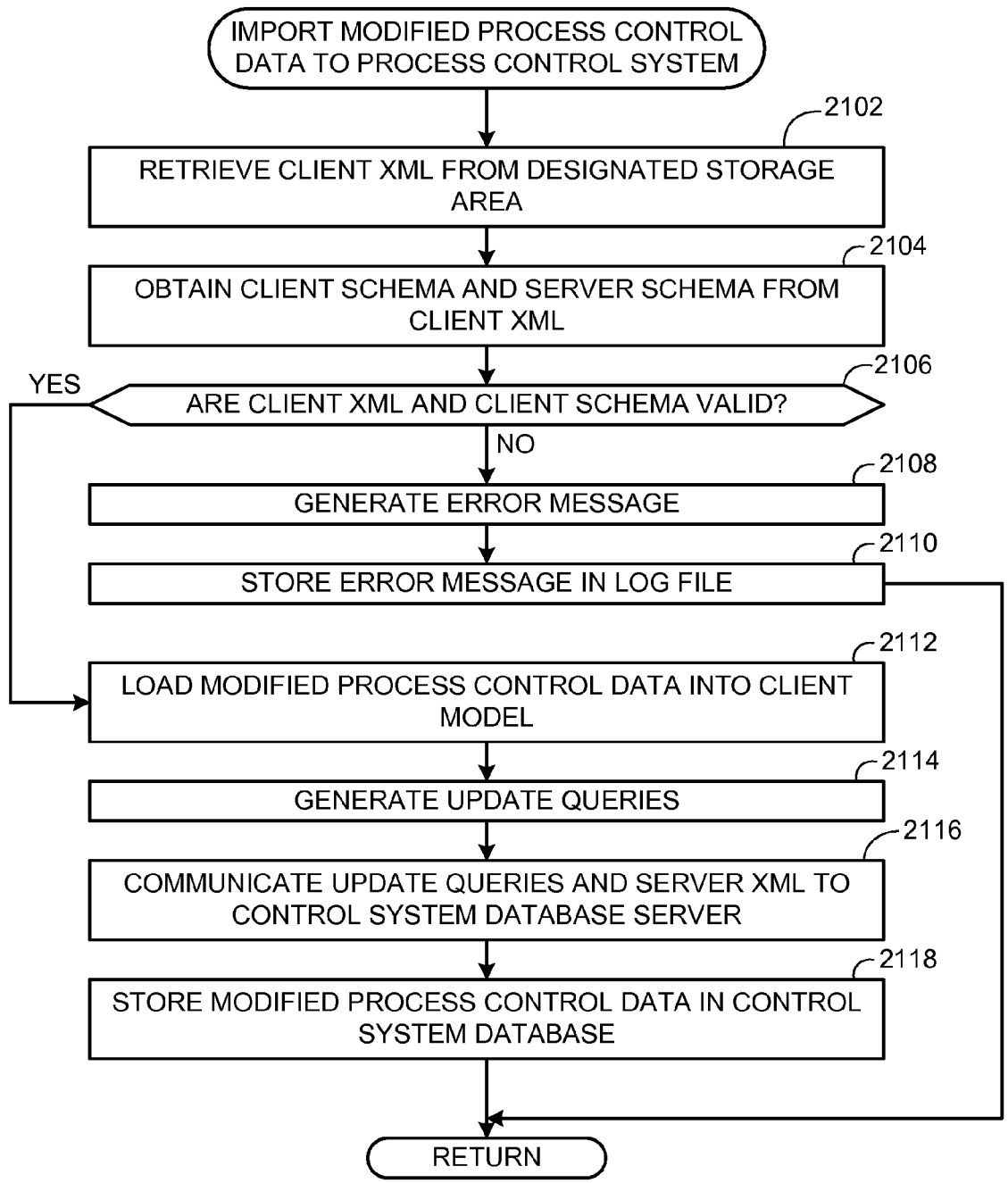
FIG. 21 is a flowchart of an example method that may be used to import modified process control data into the example process control system data manager of FIG. 1.

FIG. 21 is a flowchart of an example method that may be used to import modified process control data to the example process control system data manager 102 of FIG. 1. The example method of FIG. 21 may be used to implement the operation of block 1616 of FIG. 16. Initially, the data import/export interface 202 retrieves the client XML 108 having the modified process control data from a designated storage area (block 2102). The data import/export interface 202 then extracts client schema and server schema from the client XML 108 (block 2104) and determines whether the client XML 108 and the client schema are valid (block 2106). Specifically, the client model 210 may compare the client XML 108 and the client schema to rules to determine whether the client XML 108 and the client schema conform to, for example, data format rules, threshold value rules, or any other type of rule. If the client model 210 determines at block 2106 that the client XML 108 or the client schema is not valid, the client model 210 generates an error message (block 2108) and stores the error message in the log file 230 (FIG. 2) (block 2110). The error message may be displayed to a user via the user interface 206 and alert the user about the invalid client XML 108 or client schema. After the error message is stored in the log file 230, the import process ends and control is returned to, for example, the operation of block 1624 (FIG. 16).

If the client model 210 determines at block 2106 that the client XML 108 and the client schema are valid, the client model 210 loads the modified process control into the client model 210 (block 2112). The client model 210 may then generate an update query (e.g., one of the update queries 222 of FIG. 2) (block 2114) to store the modified process control data in the control system database 214. The client model 210 then communicates the update queries to the control system database server 212 (block 2116). The control system database server 212 then stores the modified process control data from the server XML 224 in the control system database 214 (block 2118) based on the update query. After the modified process control data is stored control is returned to, for example, the operation of block 1624 (FIG. 16).

Figure 22:
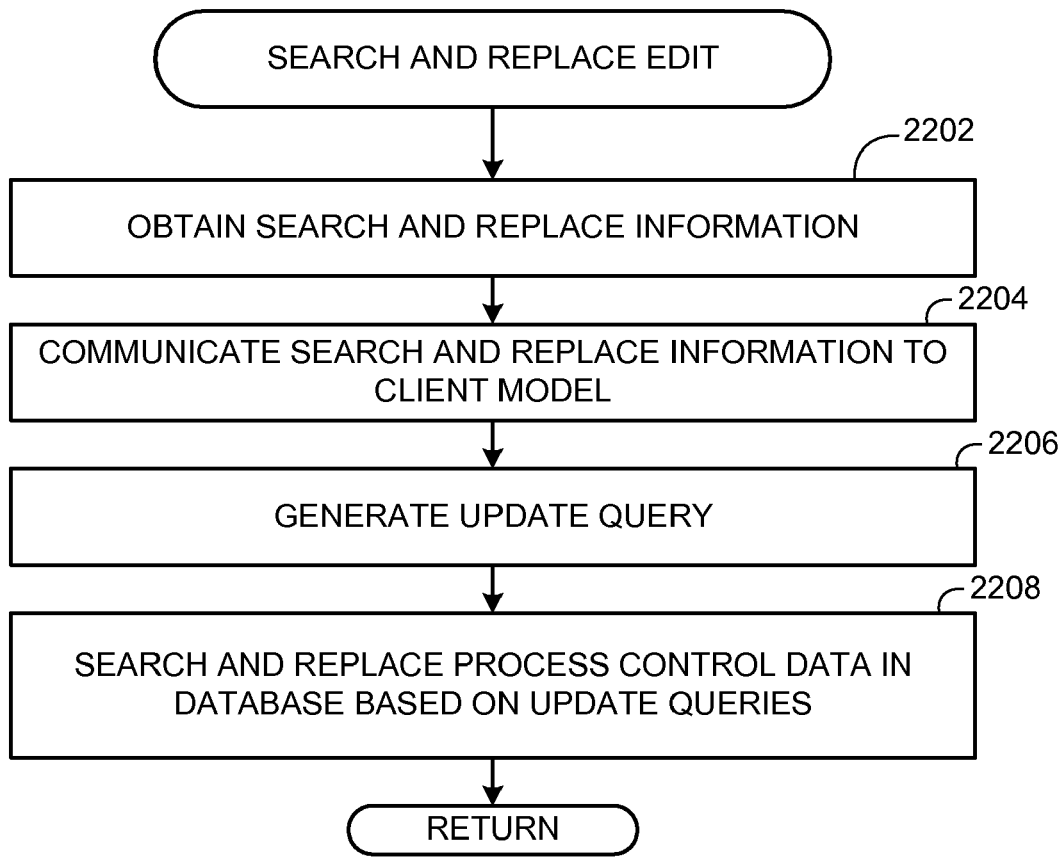
FIG. 22 is a flowchart of an example method that may be used to implement a search and replace editor.

FIG. 22 is a flowchart of an example method that may be used to implement the search and replace editor 228 of FIG. 2. The example method of FIG. 22 may be used to implement the operation of block 1620 of FIG. 16. Initially, the search and replace editor 228 obtains search and replace information from the search and replace editor interface 1500 (FIG. 15) (block 2202). For example, the search and replace engine 228 may obtain the names of one or more control devices selected via the control device(s) data field 1502 (FIG. 15), a property name specified via the property data field 1504 (FIG. 15), an existing value specified via the existing value data field 1506 (FIG. 15), and a replacement value specified via the replacement value data field 1508 (FIG. 15).

The search and replace engine 228 then communicates the search and replace information to the client model 210 (FIG. 2) (block 2204). The update query builder 220 (FIG. 2) then generates one or more of the update queries 222 (FIG. 2) (block 2206) based on the search and replace information. The control system database server 212 then performs a search and replace process in the control system database 214 (FIG. 2) based on the one or more update queries 222 (block 2208) for the process control data specified by the search and replace information obtained at block 2202. Control is then returned to, for example, the operation of block 1624 (FIG. 16).

Figure 23:
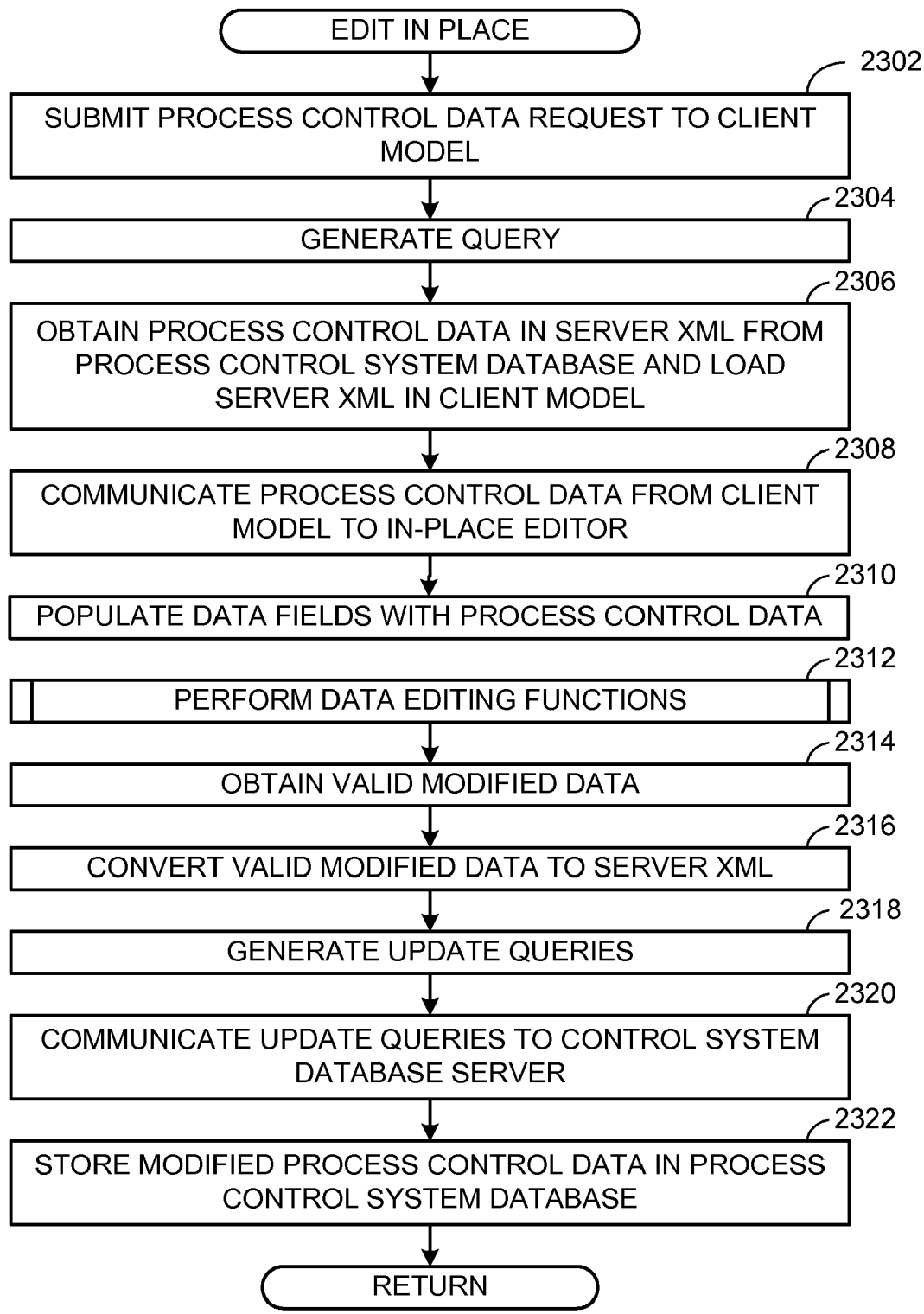
FIG. 23 is a flowchart of an example method that may be used to implement an in-place editor.

FIG. 23 is a flowchart of an example method that may be used to enable a user to edit process control data within a control system diagram using the in-place editor 226 (FIG. 2). The example method of FIG. 23 may be used to implement the operation of block 1622 of FIG. 16. Initially, the in-place editor 226 submits a process control data request to the client model 210 (FIG. 2) (block 2302). For example, a user may open the process system diagram 1002 (FIG. 10A) via the in-place editor interface 1000 (FIG. 10A) and the control device blocks 1004 of the process system diagram 1002 may generate one or more process control data requests to populate the data fields 1006 of the control device blocks 1004. After the client model 210 obtains the process control data request from the in-place editor 226, the query builder 216 generates a query (e.g., one of the queries 218 of FIG. 2) based on the process control data request (block 2304).

The client model 210 then obtains the requested process control data in the server XML 224 from the process control database 214 and load the server XML 224 in the client model 210 (block 2306). For example, the client model 210 communicates the query to the control system database server 212 and the control system database server 212 retrieves the requested process control data from the control system database 214 based on the query and communicates the requested process control data as the server XML 224 to the client model 210. The client model 210 then communicates the requested process control data to the in-place editor 226 (block 2308). The in-place editor 226 then populates the data fields 1006 of the device blocks 1004 with the process control data (block 2310).

The in-place editor 226 then performs data editing functions while the user modifies the process control data (block 2312) to ensure that modified process control data is valid. The example method described below in connection with FIG. 24 may be used to implement block 2312. The client model 210 then obtains the valid modified process control data from the in-place editor 226 (block 2314) and converts the valid modified data to the server XML 224 (block 2316).

In addition, the query builder 216 generates an update query (e.g., one of the update queries 222 of FIG. 2) (block 2318) associated with storing the valid modified data in the control system database 214. The client model 210 then communicates the update query and the server XML 224 to the control system database server 212 (block 2320). The control system database server 212 then stores the modified process control data from the server XML 224 in the control system database 214 (block 2322) based on the update query. After the modified process control data is stored control is returned to, for example, the operation of block 1624 (FIG. 16).

Figure 24:
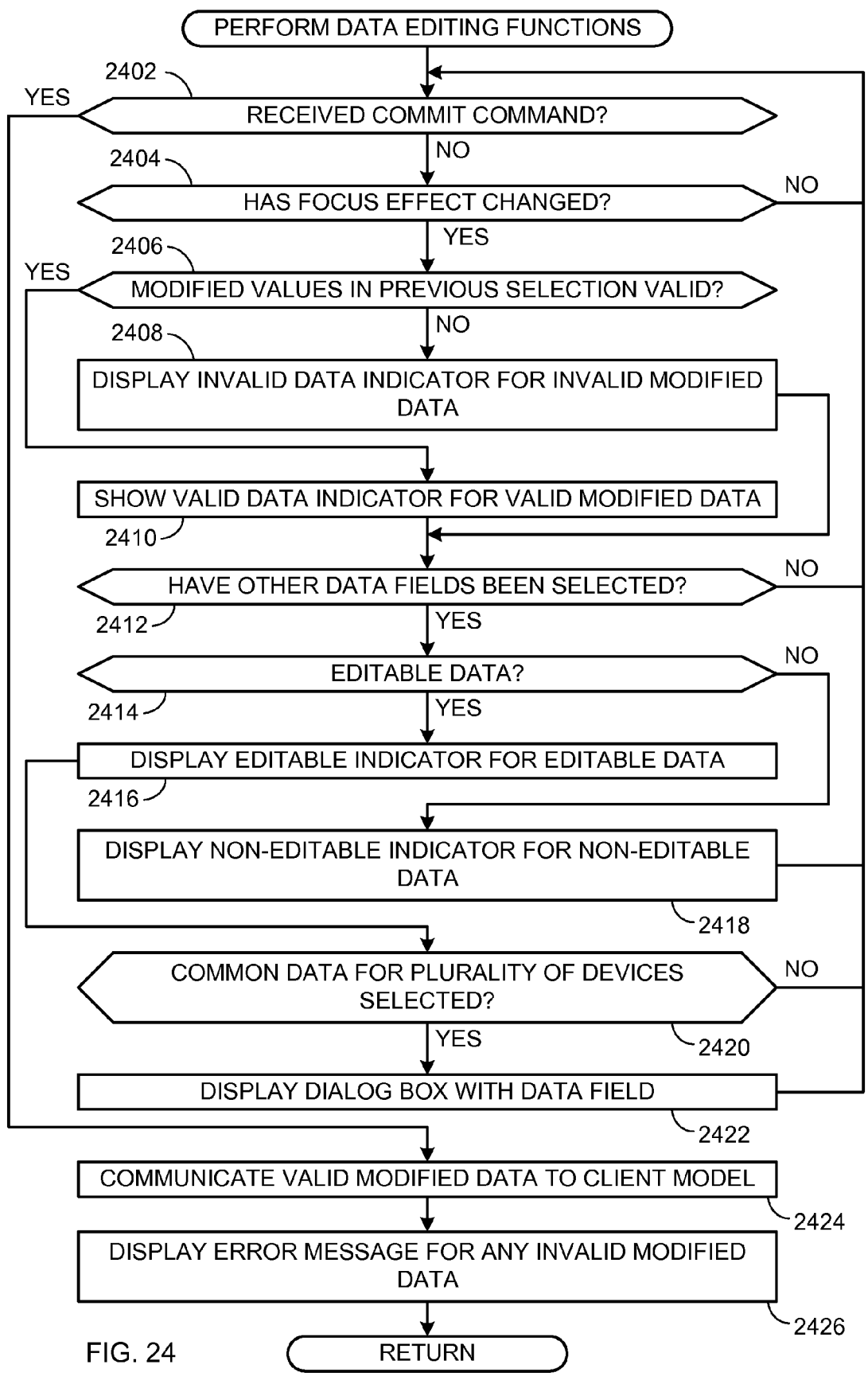
FIG. 24 is a flowchart of an example method that may be used to perform data editing functions associated with the external editing system of FIG. 1 and the in-place editor of FIG. 2.

FIG. 24 is a flowchart of an example method that may be used to perform data editing functions associated with the external editing system 104 of FIG. 1 and the in-place editor 226 of FIG. 2. The example method of FIG. 24 may be used to implement the operations of blocks 2012 (FIG. 20) and 2312 (FIG. 23). Although the example method of FIG. 24 may be implemented with any editor including the external editors 316, 318, and 320 of FIG. 3, the in-place editor 226 of FIG. 2, or the search and replace editor 228 of FIG. 2, for purposes of simplicity, the example method will be described with respect to the in-place editor 226. Initially, the in-place editor 226 determines if it has received a commit command (block 2402). The in-place editor 226 may obtain a commit command from, for example, the in-place editor interface 1000 (FIG. 10A) or the multiple attribute editor interface 1100 (FIG. 11B) when a user presses or selects a commit button (e.g., the commit button 1122 of FIG. 11B).

If a commit command has not been received, the in-place editor 226 determines if a focus effect (e.g., the focus effects 1202, 1302, or 1406 of FIGS. 12A, 13A, and 14B) has changed (block 2404). For example, as described above in connection with FIGS. 12A, 12B, 13A, 13B, 14B, and 14C, if a focus effect changes from one data cell to another data cell, from one row to another row, or from one column to another column, the in-place editor 226 determines that the focus effect has changed. The in-place editor 226 may also determine that the focus effect has changed if the focus effect is removed from a data table or grid (e.g., the table 1102 shown in the multiple attribute editor interface 1100). In addition, with respect to the in-place editor interface 1000, the in-place editor 226 may determine that a focus effect has changed if a user changes the focus effect or selection of one of the data fields 1006 (FIG. 10A) to another one of the data fields 1006. If the in-place editor 226 determines that the focus effect has not changed, control is passed back to block 2402.

If the in-place editor 226 determines that the focus effect has changed, the in-place editor 226 determines if the modified values in the previously selected data field are valid (block 2406). For example, in FIGS. 12A and 12B, when the focus effect 1202 changes from the first row 1204 to the second row 1206, the in-place editor 226 determines if the modified scan rate value 1210 is valid by comparing it to one or more process control data rules. If the in-place editor 226 determines that one or more of the modified values in the previously selected data fields are not valid, the in-place editor 226 displays an invalid data indicator indicating that one or more of the modified values in the previous selection is invalid (block 2408). For example, as shown above in connection with FIG. 12B, the in-place editor 226 may display the exclamation mark 1208 adjacent the invalid modified data and/or change one or more font attributes of the invalid modified data.

If the in-place editor 226 determines at block 2406 that all of the modified data values in the previously selected data fields are valid, the in-place editor 226 shows a valid indicator for each of the valid modified data in the previously selected data fields (block 2410). For example, as shown above in connection with FIG. 11A, the in-place editor 226 may display the pen icon 1120 adjacent the valid modified data or may show the highlighted border 1118 for a data cell containing the valid modified data value.

After the in-place editor 226 has displayed an invalid data indicator (block 2408) or a valid data indicator (block 2410), the in-place editor 226 determines if one or more other data fields have been selected (block 2412). If no other data fields have been selected, control is returned to block 2402. However, if one or more other data fields have been selected, the in-place editor 226 determines whether the selected data fields contain editable process control data (block 2414). If the in-place editor 226 determines that one or more of the selected data fields contain non-editable data, the in-place editor 226 displays a non-editable indicator for each of the non-editable data (block 2418). For example, as shown in FIG. 10A, the in-place editor 226 highlights the textbox 1010 to indicate that the device name field is not editable. After the in-place editor 226 displays a non-editable indicator, control is passed back to block 2402.

If any of the selected data fields contain editable data, the in-place editor 226 displays an editable indicator for each portion of the editable data indicating to a user that the process control data values in those selected data fields are editable (block 2416). For example, as shown in FIG. 10A, the in-place editor 226 may highlight the value or text of the device name field 1008 to indicate that it is editable. Also, as shown in FIG. 11A, the in-place editor 226 may place the cursor 1116 in a selected data cell to indicate that the data cell contains editable process control data. After the in-place editor 226 displays an editable indicator (block 2416), the in-place editor 226 then determines whether two or more process control data common to a plurality of control devices have been selected (block 2420). For example, if a user selects the process control data in the scan rate column 1402 as shown in FIG. 14A, the in-place editor 226 determines at block 2420 that a plurality of common process control data has been selected.

If a plurality of common process control data has been selected, the in-place editor 226 displays a dialog box with an editable data field (block 2422). For example, as shown in FIG. 14A, the in-place editor 226 displays the editor dialog 1404 with an editable data field. In this case, the in-place editor 226 populates the data fields of the selected scan rate column 1402 with the value entered via the editor dialog 1404. After the in-place editor 226 displays the editor dialog 1404 or, if at block 2420 the in-place editor 226 determines that a plurality of common process control data has not been selected, control is passed back to block 2402.

If at block 2402 the in-place editor 226 determines that it has received a commit command, the in-place editor 226 communicates the valid data in the editor interface display (e.g., the in-place editor interface 1000 of FIG. 10A or the multiple attribute editor interface 1100 of FIG. 11) to the client model 210 (block 2424). For example, the in-place editor 226 communicates all of the modified values that the in-place editor 226 indicated as valid via a valid data indicator (e.g., the border highlight 1118 or the pen icon 1120 of FIG. 11A). The in-place editor 226 then displays an error message for any invalid modified data in the editor interface display (block 2426) and control returns to a calling process or function.

Figure 25:
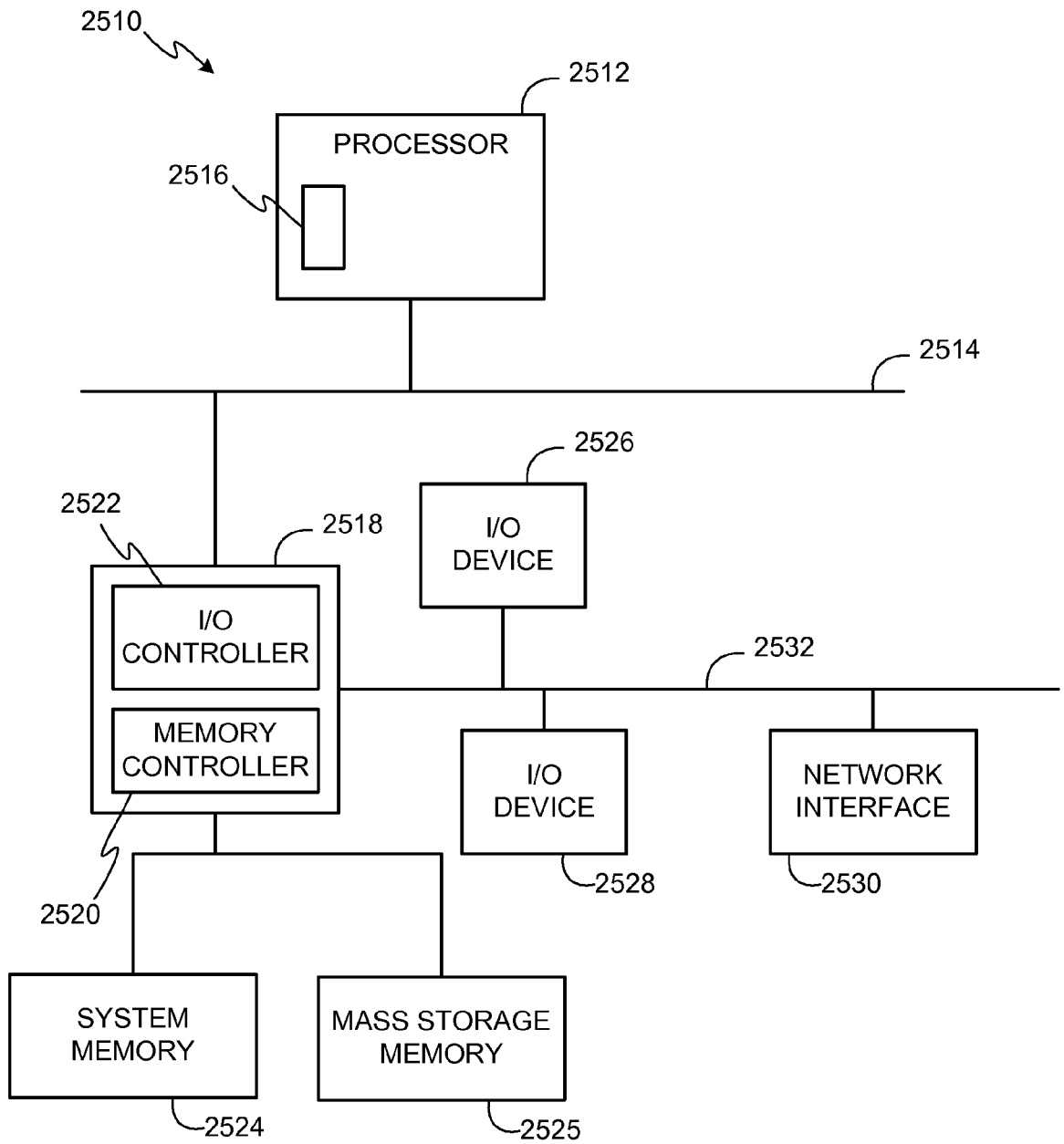
FIG. 25 is a block diagram of an example processor system that may be used to implement the example systems and methods described herein.

FIG. 25 is a block diagram of an example processor system that may be used to implement the example apparatus, methods, and articles of manufacture described herein. As shown in FIG. 25, the processor system 2510 includes a processor 2512 that is coupled to an interconnection bus 2514. The processor 2512 includes a register set or register space 2516, which is depicted in FIG. 25 as being entirely on-chip, but which could alternatively be located entirely or partially off-chip and directly coupled to the processor 2512 via dedicated electrical connections and/or via the interconnection bus 2514. The processor 2512 may be any suitable processor, processing unit or microprocessor. Although not shown in FIG. 25, the system 2510 may be a multi-processor system and, thus, may include one or more additional processors that are identical or similar to the processor 2512 and that are communicatively coupled to the interconnection bus 2514.

The processor 2512 of FIG. 25 is coupled to a chipset 2518, which includes a memory controller 2520 and an input/output (I/O) controller 2522. As is well known, a chipset typically provides I/O and memory management functions as well as a plurality of general purpose and/or special purpose registers, timers, etc. that are accessible or used by one or more processors coupled to the chipset 2518. The memory controller 2520 performs functions that enable the processor 2512 (or processors if there are multiple processors) to access a system memory 2524 and a mass storage memory 2525.

The system memory 2524 may include any desired type of volatile and/or non-volatile memory such as, for example, static random access memory (SRAM), dynamic random access memory (DRAM), flash memory, read-only memory (ROM), etc. The mass storage memory 2525 may include any desired type of mass storage device including hard disk drives, optical drives, tape storage devices, etc.

The I/O controller 2522 performs functions that enable the processor 2512 to communicate with peripheral input/output (I/O) devices 2526 and 2528 and a network interface 2530 via an I/O bus 2532. The I/O devices 2526 and 2528 may be any desired type of I/O device such as, for example, a keyboard, a video display or monitor, a mouse, etc. The network interface 2530 may be, for example, an Ethernet device, an asynchronous transfer mode (ATM) device, an 802.11 device, a DSL modem, a cable modem, a cellular modem, etc. that enables the processor system 2510 to communicate with another processor system.

While the memory controller 2520 and the I/O controller 2522 are depicted in FIG. 25 as separate functional blocks within the chipset 2518, the functions performed by these blocks may be integrated within a single semiconductor circuit or may be implemented using two or more separate integrated circuits.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method of modifying process control data, comprising:
    storing process control data in an extensible markup language format in a server database in accordance with a server schema and in a client in accordance with a client schema, the process control data associated with a plurality of control devices of a control system;
    receiving a request from a user to edit the process control data, the request indicating whether to edit the process control data in the client, the server database, or an editor external to a process control system application associated with the process control system;
    determining based on the request to edit the process control data in the client, the server database, or the editor external to the process control system application associated with the process control system;
    when the request indicates a user request to edit the process control data in the client, editing the process control data in the extensible markup language format in accordance with the client schema;
    when the request indicates a user request to edit the process control data in the server database:
        receiving a value from a user interface of the process control system application; and
        submitting the value and an update query to the server database, the update query requesting the server database to store the value in a corresponding entry of the process control data in accordance with the server schema; and
    when the request indicates a user request to edit the process control data using the editor external to the process control system application:
        converting the process control data in the extensible markup language format to a second data format;
        editing the process control data in the second data format; and
        converting the modified process control data from the second data format to the extensible markup language format based on the client schema.

2. A method as defined in claim 1, wherein the process control data in accordance with the client schema is obtained by converting the process control data from the server schema to the client schema in response to receiving a user request for specific process control data from a larger set of process control data in the server database.

3. A method as defined in claim 1, wherein the editor external to the process control system application is a word processing application or a spreadsheet application.

4. A method as defined in claim 1, wherein the second data format is associated with a relational database, a structured query language database, or a file system.

5. A method as defined in claim 1, wherein when editing the process control data in the client, the process control data is modified in data fields embedded in a process control system diagram.

6. A method as defined in claim 1, wherein when submitting the value and the update query to the server database, the update query instructs the server database to search and replace a plurality of process control data values in the server database with the value.

7. A method as defined in claim 1, further comprising, when editing the process control data using the process control system application or when editing the process control data using the editor external to the process control system application, converting the process control data from an organization in accordance with the client schema to an organization in accordance with the server schema.

8. An apparatus for modifying process control data, comprising:
    a processor system; and
    a memory communicatively coupled to the processor system, the memory including stored instructions that enable the processor system to:
        store process control data in an extensible markup language format in a server database in accordance with a server schema and in a client in accordance with a client schema, the process control data associated with a plurality of control devices of a control system;
        receive a request from a user to edit the process control data, the request indicating whether to edit the process control data in the client, the server database, or an editor external to a process control system application associated with the process control system;

determine based on the request to edit the process control data in the client, the server database, or the editor external to the process control system application associated with the process control system;

when the request indicates a user request to edit process control data in the client, edit the process control data in the extensible markup language format in accordance with the client schema;

when the request indicates a user request to edit process control data in the server database:
receive a value from a user interface of the process control system application; and
submit the value and an update query to the server database, the update query requesting the server database to store the value in a corresponding entry of the process control data in accordance with the server schema; and when the request indicates a user request to edit the process control data using the editor external to the process control system application:
convert the process control data in the extensible markup language format to a second data format;
edit the process control data in the second data format; and
convert the modified process control data from the second data format to the extensible markup language format based on the client schema.

9. An apparatus as defined in claim 8, wherein the instructions enable the processor system to obtain the process control data in accordance with the client schema by converting the process control data from the server schema to the client schema in response to receiving a user request for specific process control data from a larger set of process control data in the server database.

10. An apparatus as defined in claim 8, wherein the editor external to the process control system application is a word processing application or a spreadsheet application.

11. An apparatus as defined in claim 8, wherein the second data format is associated with a relational database, a structured query language database, or a file system.

12. An apparatus as defined in claim 8, wherein when editing the process control data in the client, the instructions enable the processor system to modify the process control data in data fields embedded in a process control system diagram.

13. A machine accessible medium having instructions stored thereon that, when executed, cause a machine to at least:
store process control data in an extensible markup language format in a server database in accordance with a server schema and in a client in accordance with a client schema, the process control data associated with a plurality of control devices of a control system;
receive a request from a user to edit the process control data, the request indicating whether to edit the process control data in the client, the server database, or an editor external to a process control system application associated with the process control system;
determine based on the request to edit the process control data in the client, the server database, or the editor external to the process control system application associated with the process control system;
when the request indicates a user request to edit process control data in the client, edit the process control data in the extensible markup language format in accordance with the client schema;
when the request indicates a user request to edit the process control data in the server database:
receive a value from a user interface of the process control system application; and
submit the value and an update query to the server database, the update query requesting the server database to store the value in a corresponding entry of the process control data in accordance with the server schema; and
when the request indicates a user request to edit process control data using the editor external to the process control system application:
convert the process control data in the extensible markup language format to a second data format;
edit the process control data in the second data format; and
convert the modified process control data from the second data format to the extensible markup language format based on the client schema.

14. A machine accessible medium as defined in claim 13, wherein the instructions, when executed, cause the machine to obtain the process control data in accordance with the client schema is obtained by converting the process control data from the server schema to the client schema in response to receiving a user request for specific process control data from a larger set of process control data in the server database.

15. A machine accessible medium as defined in claim 13, wherein the editor external to the process control system application is a word processing application or a spreadsheet application.

16. A machine accessible medium as defined in claim 13, wherein the second data format is associated with a relational database, a structured query language database, or a file system.

17. An machine accessible medium as defined in claim 13, wherein when editing the process control data in the client, the instructions, when executed, cause the machine to enable modification of the process control data in data fields embedded in a process control system diagram.

18. A method of modifying process control data, comprising:
obtaining the process control data in a first data format from a database, the first data format indicating to edit the process control data in a process control system database;
converting the process control data from the first data format to an extensible markup language format;
to edit the process control data, converting the process control data from the extensible markup language format to a second data format;
obtaining at least one modified process control data value associated with the process control data in the second data format;
converting the modified process control data from the second data format to the extensible markup language format;
determining the validity of the process control data while in the extensible markup language format based on a plurality of rules associated with settings of a process control system;

when the modified process control data is valid, converting the modified process control data value from the extensible markup language format to the first data format; and storing the modified process control data value in the first data format in the database.

19. A method as defined in claim 18, wherein the second data format is a structured query language data format editable external from a process control system application associated with the process control system.

* * * * *